US012183099B2

(12) United States Patent
Sarin

(10) Patent No.: US 12,183,099 B2
(45) Date of Patent: Dec. 31, 2024

(54) DETECTION OF DUPLICATED DATA FOR NON-FUNGIBLE TOKENS

(71) Applicant: PayPal, Inc., San Jose, CA (US)

(72) Inventor: Pankaj Sarin, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 540 days.

(21) Appl. No.: 17/509,735

(22) Filed: Oct. 25, 2021

(65) Prior Publication Data

US 2023/0126839 A1    Apr. 27, 2023

(51) Int. Cl.
*G06V 20/80* (2022.01)
*G06V 20/00* (2022.01)

(52) U.S. Cl.
CPC .............. *G06V 20/80* (2022.01); *G06V 20/95* (2022.01)

(58) Field of Classification Search
CPC ................................ G06V 20/80; G06V 20/95
See application file for complete search history.

(56) References Cited

U.S. PATENT DOCUMENTS

| | | | | |
|---|---|---|---|---|
| 6,330,662 | B1* | 12/2001 | Patel ...................... | G06F 9/3804 712/E9.056 |
| 11,075,891 | B1* | 7/2021 | Long ...................... | H04L 9/3213 |
| 2017/0032351 | A1* | 2/2017 | Burroughs, Jr. ...... | G06Q 20/326 |
| 2021/0319429 | A1* | 10/2021 | Yantis ................... | G06Q 20/123 |
| 2022/0337392 | A1* | 10/2022 | Schauer ................ | H04L 9/3247 |
| 2022/0351280 | A1* | 11/2022 | Cardenas Gasca ................................. G06Q 30/0643 |
| 2023/0008345 | A1* | 1/2023 | Agrawal ................ | G06F 21/44 |
| 2023/0073859 | A1* | 3/2023 | Matthews ............ | G06Q 30/0641 |
| 2023/0094544 | A1* | 3/2023 | Paripally ................ | G06F 21/64 713/168 |
| 2023/0103125 | A1* | 3/2023 | Berger ................ | G06Q 30/0641 345/419 |
| 2023/0113795 | A1* | 4/2023 | Vlahovic ............. | G06Q 20/4016 705/14.33 |
| 2023/0120476 | A1* | 4/2023 | Baskin ................ | G06Q 20/3672 705/66 |
| 2023/0126016 | A1* | 4/2023 | Nelson ................ | G06Q 20/3674 705/65 |
| 2024/0111880 | A1* | 4/2024 | Redlich ................. | G06F 21/602 |

FOREIGN PATENT DOCUMENTS

CA        2975054 A1 *  2/2018  ............. G06F 18/00

* cited by examiner

*Primary Examiner* — Shaghayegh Azima
(74) *Attorney, Agent, or Firm* — Greenberg Traurig, LLP

(57) ABSTRACT

Systems and techniques for facilitating detection of data duplication issues relating to generation of non-fungible tokens are provided. In various embodiments, a computer system can access a digital artwork image. In various aspects, the computer system can generate a set of plagiarism probabilities by comparing the digital artwork image to a set of cached digital artwork images. In various instances, a given plagiarism probability in the set of plagiarism probabilities can indicate a likelihood that the digital artwork image was derived from a given cached digital artwork image in the set of cached digital artwork images. In various cases, the computer system can calculate an authenticity score for the digital artwork image based on the set of plagiarism probabilities. In various aspects, the computer system can determine whether the authenticity score for the digital artwork image satisfies a threshold authenticity value.

18 Claims, 14 Drawing Sheets

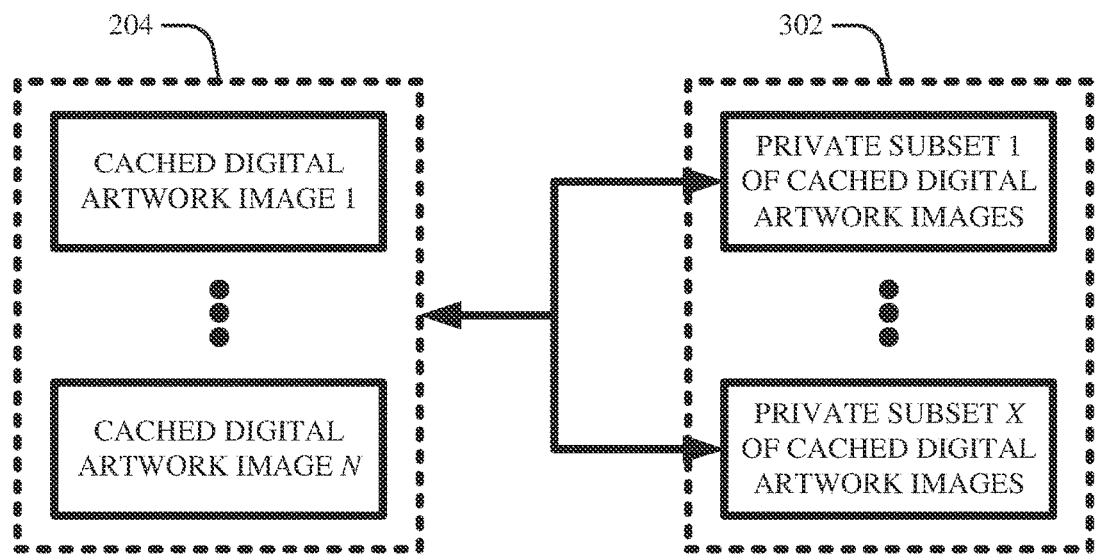
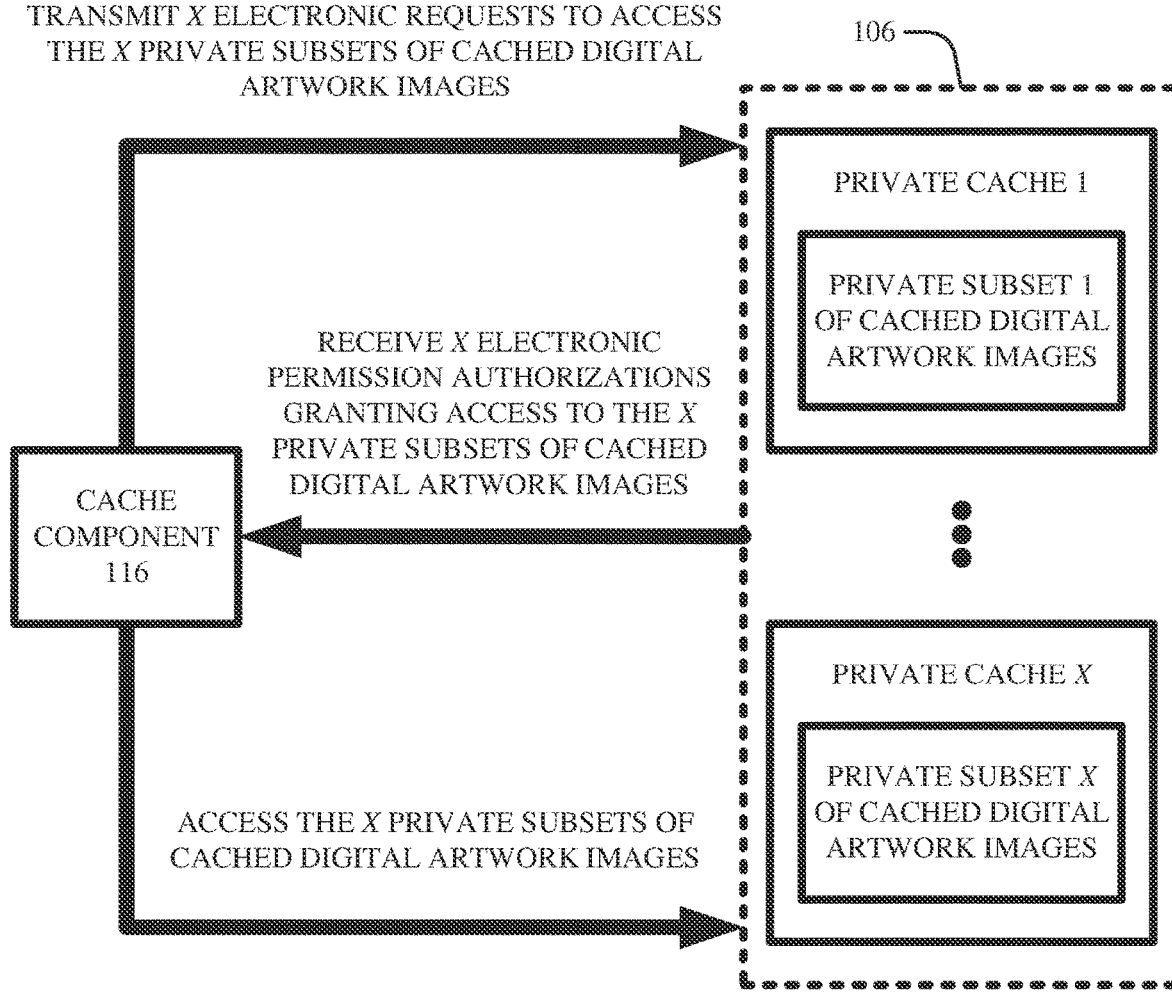
FIG. 3

DETECTION OF DUPLICATED DATA FOR NON-FUNGIBLE TOKENS

TECHNICAL FIELD

The subject disclosure relates generally to non-fungible tokens, and more specifically to systems and/or techniques that can facilitate detection of data duplication issues relating to the generation of non-fungible tokens, according to various embodiments (including detection of data plagiarism in some instances).

BACKGROUND

A non-fungible token is a unique and non-interchangeable unit of electronic data that may be stored on a digital ledger and that can represent a reproducible item, such as a piece of digital artwork. Accordingly, a non-fungible token can be considered as being analogous to a certificate of authenticity for the piece of digital artwork and thus can be used to facilitate secure trading, selling, and/or transferring of the piece of digital artwork. Although a non-fungible token can, once generated, prevent illegitimate transfers of digital artwork, the non-fungible token is nevertheless vulnerable to illegitimate generation by fraudsters and/or plagiarists. Unfortunately, existing systems and techniques do not offer any solution to this significant vulnerability.

Accordingly, systems and/or techniques that can address one or more of these technical problems can be desirable.

BRIEF DESCRIPTION OF THE DRAWINGS

FIG. 3 illustrates a high-level block diagram showing how a set of cached digital artwork images can be accessed from a set of private caches in accordance with one or more embodiments described herein.

DETAILED DESCRIPTION

Figure 1:
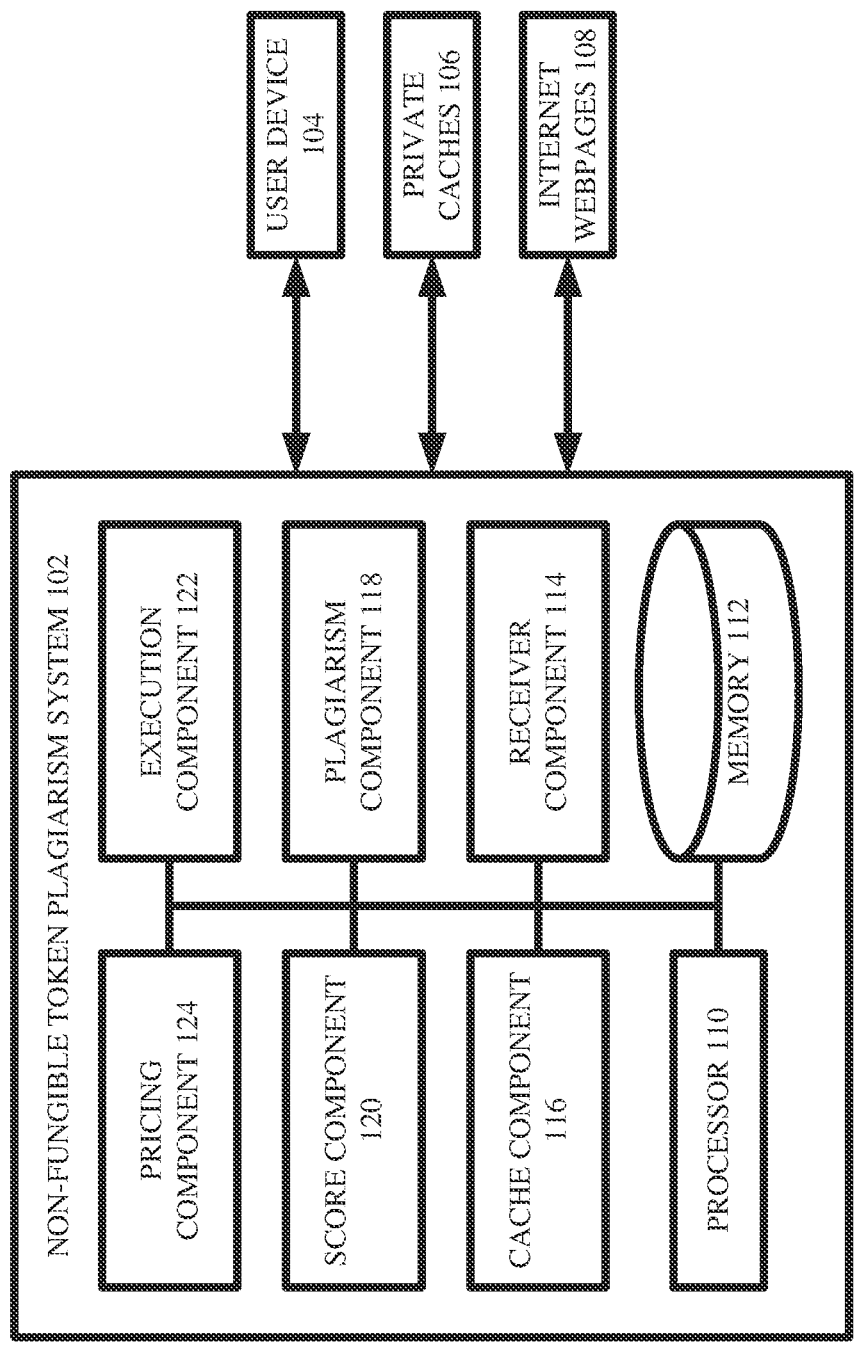
FIG. 1 illustrates a high-level block diagram of an example, non-limiting system that facilitates detection of data duplication issues relating to generation of non-fungible tokens in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A non-fungible token can be a unique and/or non-interchangeable unit of electronic data that can be stored on a digital ledger (e.g., blockchain) and that can represent an easily-reproducible item. For instance, a non-fungible token can represent a collectible item (e.g., a collectible playing card), an event ticket (e.g., a concert ticket, a gala ticket), an in-game asset (e.g., an item within a video game), a piece of music (e.g., a soundtrack), a piece of film (e.g., a motion picture), a legal contract (e.g., an employment contract), and/or any other suitable document and/or item. In particular, a non-fungible token can represent a piece of digital artwork. Accordingly, the non-fungible token can be considered as being analogous to a certificate of authenticity for the piece of digital artwork. Thus, the non-fungible token can be used to facilitate secure trading, selling, and/or transferring of the piece of digital artwork. More specifically, the piece of digital artwork might be easily reproduced by plagiarists and/or fraudsters, but the non-fungible token that represents the piece of digital artwork cannot be easily reproduced by plagiarists and/or fraudsters.

Although a non-fungible token can, once generated, prevent fraudulent transfers of digital artwork, the non-fungible token is nevertheless vulnerable to illegitimate generation by fraudsters and/or plagiarists. In other words, even though an already-created non-fungible token cannot be impermissibly reproduced by a plagiarist and/or fraudster, a not-yet-created non-fungible token can be impermissibly created in the first instance by a plagiarist and/or fraudster. For example, suppose that an artist creates a particular piece of digital artwork but does not create a non-fungible token to represent the particular piece of digital artwork. Furthermore, suppose that a fraudster plagiarizes the particular piece of digital artwork and subsequently creates a non-fungible token to represent the plagiarized version of the particular piece of digital artwork. In such case, the fraudster can have total control of the non-fungible token, which can leave the victimized artist with no or little recourse. Unfortunately, existing systems and/or techniques do not offer any solution to this significant vulnerability of non-fungible tokens.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate detection of data duplication issues relating to generation of non-fungible tokens. In other words, various embodiments described herein can include a computerized tool (e.g., any suitable combination of computer-executable hardware and/or computer-executable software) that can electronically determine, via execution of a trained machine learning model, whether a given piece of digital artwork is likely the result of plagiarism from one or more existing pieces of digital artwork, and that can electronically generate and/or refrain from generating a non-fungible token for the given piece of digital artwork based on such determination.

In various embodiments, a computerized tool as described herein can include a receiver component, a cache component, a plagiarism component, a score component, and an execution component.

In various embodiments, the receiver component of the computerized tool can electronically receive and/or otherwise electronically access a digital artwork image for which a non-fungible token is desired to generated. In various aspects, the receiver component can electronically retrieve the digital artwork image from any suitable centralized and/or decentralized data structure (e.g., graph data structure, relational data structure, hybrid data structure). Accordingly, other components of the computerized tool can electronically interact with (e.g., read, write, edit, manipulate) the digital artwork image.

In various embodiments, the cache component of the computerized tool can electronically access a set of cached digital artwork images. In various aspects, the set of cached digital artwork images can include any suitable number of cached digital artwork images, where each cached digital artwork image can be considered as a piece of digital artwork that predates the digital artwork image accessed by the receiver component. In various instances, as described in more detail herein, the computerized tool can compare the digital artwork image to the set of cached digital artwork images, so as to determine a likelihood that the digital artwork image was plagiarized and/or otherwise derived from one or more of the set of cached digital artwork images.

In various cases, the cache component can electronically store and/or otherwise electronically maintain the set of cached digital artwork images. In various other cases, one or more private caches (e.g., cloud-based data structures) can collectively electronically store and/or maintain the set of cached digital artwork images, the cache component can electronically request the one or more private caches to grant access privileges, the one or more private caches can electronically grant and/or authorize such access privileges, and the cache component can accordingly access the set of cached digital artwork images. In still other cases, one or more internet webpages can collectively electronically store and/or maintain the set of cached digital artwork images, the cache component can identify such one or more internet webpages via execution of one or more web crawlers on the internet, and the cache component can accordingly access the set of cached digital artwork images upon identifying the one or more internet webpages. In yet other cases, some of the set of cached digital artwork images can be electronically stored/maintained in the one or more private caches, while others of the set of cached digital artwork images can be electronically stored/maintained in the one or more internet webpages. In such scenarios, the cache component can request access privileges from the one or more private caches and can execute web crawlers to identify the one or more internet webpages. In any case, the cache component can have electronic access to the set of cached digital artwork images.

In various embodiments, the plagiarism component of the computerized tool can electronically access and/or electronically control a machine learning model. In various aspects, the machine learning model can exhibit any suitable artificial intelligence architecture. For instance, the machine learning model can be a deep learning neural network, a support vector machine, a tree-based model, and/or a naïve Bayes model. In various instances, the machine learning model can be configured to receive as input the digital artwork image and any given cached digital artwork image, and the machine learning model can be configured to produce as output a scalar that represents a probability that the digital artwork image was derived (e.g., plagiarized) from the given cached digital artwork image. In various other cases, the machine learning model can be configured to receive as input one or more fragments of the digital artwork image (e.g., one or more pixel patches of the digital artwork image that have any suitable sizes and that are separated by any suitable distances) and any given cached digital artwork image, and the machine learning model can be configured to produce as output a scalar that represents a probability that the digital artwork image was derived (e.g., plagiarized) from the given cached digital artwork image. Accordingly, the plagiarism component can electronically execute the machine learning model on each of the set of cached digital artwork images, thereby yielding a set of plagiarism probabilities that respectively correspond to the set of cached digital artwork images. Note that the term "plagiarism probability" as used herein thus also connotes a "data duplication probability". If a non-fungible token is generated based on a plagiarized digital artwork, then the non-fungible token is being generated based on duplicate data (in this case all or a portion of a pre-existing digital artwork).

As those having ordinary skill in the art will appreciate, the machine learning model can be trained in any suitable fashion (e.g., supervised training, unsupervised training, reinforcement learning) so as to exhibit the above functionality. For example, there can be a training dataset that includes any suitable number of training image pairs and any suitable number of plagiarism probability annotations that respectively correspond to the training image pairs. In various aspects, the machine learning model can be trained based on such training dataset. More specifically, the internal parameters (e.g., weights, biases) of the machine learning model can be randomly initialized. For any given training image pair in the training dataset and for the plagiarism probability annotation that corresponds to the given training image pair, the given training image pair can be fed to the machine learning model, which can cause the machine learning model to produce some output based on the given training image pair. For example, the given training image pair can be received by an input layer of the machine learning model, the given training image pair can complete a forward pass through one or more hidden layers of the machine learning model, and an output layer of the machine learning model can generate the output based on activations from the one or more hidden layers. In various instances, the output can be considered as indicating an inferred level of probability that one image in the given training image pair was derived (e.g., plagiarized) from the other image in the given training image pair. In contrast, the plagiarism probability annotation can be considered as indicating a ground-truth probability that one image in the given training image pair was derived from the other image in the given training image pair. Accordingly, an error/loss can be computed between the output and the plagiarism probability annotation, and backpropagation can be implemented on the internal parameters of the machine learning model based on the error/loss.

This procedure can be repeated for each training image pair in the training dataset, with the result being that the internal parameters of the machine learning model become iteratively optimized for inferring plagiarism probabilities when given two input images. Those having ordinary skill in the art will appreciate that any suitable training batch sizes, any suitable training termination criteria, and/or any suitable error/loss functions can be implemented. Furthermore, those having ordinary skill in the art will appreciate that an analogous training technique can be implemented in situations where the machine learning model is configured to receive as input one image and one or more fragments of another image.

In various embodiments, the score component of the computerized tool can electronically compute an authenticity score based on the set of plagiarism probabilities generated by the plagiarism component. In various aspects, the score component can apply any suitable mathematical function that takes as arguments the set of plagiarism probabilities and that produces as output a scalar that indicates a level and/or likelihood of authenticity of the digital artwork image, and such scalar can be considered as the authenticity score. For example, in some cases, the score component can identify a highest plagiarism probability in the set of plagiarism probabilities, the score component can subtract such highest plagiarism probability from one (e.g., from unity), and such difference can be considered as the authenticity score. In other cases, the score component can feed the set of plagiarism probabilities to any suitable machine learning model, and such machine learning model can produce as output the authenticity score. As those having ordinary skill in the art will appreciate, such machine learning model can be trained via any suitable training paradigm (e.g., supervised training, unsupervised training, reinforcement learning).

In various embodiments, the execution component of the computerized tool can take and/or initiate any suitable computerized actions based on the authenticity score. More specifically, in various aspects, the execution component can electronically compare the authenticity score to any suitable threshold value. If the authenticity score satisfies the threshold value (e.g., if the authenticity score indicates that the digital artwork image is sufficiently likely to be authentic and/or not plagiarized), the execution component can electronically generate a non-fungible token to represent the digital artwork image. As those having ordinary skill in the art will appreciate, the execution component can implement any suitable cryptographic techniques to generate the non-fungible token. On the other hand, if the authenticity score fails to satisfy the threshold value (e.g., if the authenticity score indicates that the digital artwork image is not sufficiently likely to be authentic), the execution component can electronically refrain from generating the non-fungible token to represent the digital artwork image.

In various other instances, the execution component can electronically generate recommendations based on the authenticity score. For example, if the authenticity score satisfies the threshold value (e.g., if the authenticity score indicates that the digital artwork image is sufficiently likely to be authentic and/or not plagiarized), the execution component can electronically generate a message that recommends that a non-fungible token should be created to represent the digital artwork image, due to sufficiently high authenticity and/or sufficiently low likelihood of plagiarism. The execution component can then electronically transmit such message to any suitable computing device as desired. On the other hand, if the authenticity score fails to satisfy the threshold value (e.g., if the authenticity score indicates that the digital artwork image is not sufficiently likely to be authentic), the execution component can electronically generate a message that recommends that a non-fungible token should not be created to represent the digital artwork image, due to insufficiently high authenticity and/or insufficiently low likelihood of plagiarism. The execution component can then electronically transmit such message to any suitable computing device as desired.

In this way, the computerized tool described herein can perform a gatekeeping functionality with respect to non-fungible tokens. More specifically, the computerized tool can generate non-fungible tokens (and/or can recommend that non-fungible tokens be generated) for any digital artwork images that have sufficient likelihoods of authenticity. In contrast, the computerized tool can refrain from generating non-fungible tokens (and/or can recommend that non-fungible tokens not be generated) for any digital artwork images that have insufficient likelihoods of authenticity. Accordingly, the computerized tool described herein can help to prevent fraudsters and/or plagiarists from impermissibly generating/creating non-fungible tokens for plagiarized digital artworks. In still other words, the computerized tool described herein can be considered as addressing, solving, and/or ameliorating the problem of illegitimate non-fungible token generation, which is a serious and significant security vulnerability that afflicts non-fungible tokens.

Various embodiments described herein can be employed to use hardware and/or software to solve problems that are highly technical in nature (e.g., to facilitate detection of data duplication issues relating to generation of non-fungible tokens), that are not abstract and that cannot be performed as a set of mental acts by a human. Further, some of the processes performed can be performed by a specialized computer (e.g., trained machine learning models, non-fungible tokens) for carrying out defined tasks related to detection of data duplication issues relating to generation of non-fungible tokens.

For example, some defined tasks of various embodiments described herein can include: accessing a digital artwork image; generating a set of plagiarism probabilities by comparing the digital artwork image to a set of cached digital artwork images, wherein a given plagiarism probability in the set of plagiarism probabilities indicates a likelihood that the digital artwork image was derived from a given cached digital artwork image in the set of cached digital artwork images; calculating an authenticity score for the digital artwork image based on the set of plagiarism probabilities; determining whether the authenticity score for the digital artwork image satisfies a threshold authenticity value; when the authenticity score satisfies the threshold authenticity value, generating a non-fungible token to represent the digital artwork image; and when the authenticity score fails to satisfy the threshold authenticity value, refraining from generating the non-fungible token.

Such defined tasks are not performed manually by humans. Indeed, neither the human mind nor a human with pen and paper can electronically retrieve a digital artwork image, electronically execute a machine learning model on the digital artwork image and on a set of cached digital artwork images to yield a set of plagiarism probabilities, electronically compute an authenticity score based on the set of plagiarism probabilities, and/or electronically generate a non-fungible token based on the authenticity score. Instead, various embodiments described herein are inherently and inextricably tied to computer technology and cannot be implemented outside of a computing environment (e.g., machine learning models and non-fungible tokens are inherently computerized constructs that cannot be implemented in any sensible, practical, or reasonable way without computers).

In various instances, embodiments described herein can integrate into a practical application the disclosed teachings regarding detection of data duplication issues relating to generation of non-fungible tokens. As explained above, non-fungible tokens can facilitate the secure transfer, trade, and/or sale of digital artwork. However, a significant security vulnerability of non-fungible tokens is that they can be illegitimately generated by fraudsters and/or plagiarists. Unfortunately, existing systems and/or techniques do not offer any solution to this significant security vulnerability problem. In stark contrast, various embodiments described herein can address this technical problem. Specifically, various embodiments described herein include a computerized tool that can electronically access a digital artwork image, that can electronically access a set of cached digital artwork images, that can electronically execute a machine learning model (e.g., convolutional neural network) on the digital artwork image and the set of cached digital artwork images, thereby resulting in a set of plagiarism probabilities, that can electronically compute an authenticity score based on the set of plagiarism probabilities, and that can electronically determine whether or not to generate a non-fungible token for the digital artwork image based on the authenticity score. In other words, the computerized tool described herein can estimate a level of authenticity of the digital artwork image and can either permit or prohibit generation of a non-fungible token for the digital artwork image based on the estimated level of authenticity. In this way, the computerized tool can be considered as performing a gate-keeping functionality that prevents fraudsters and/or plagiarists from impermissibly creating non-fungible tokens. Such a computerized tool ameliorates the significant security vulnerability of illegitimate generation of non-fungible tokens, and thus such a computerized tool certainly constitutes a useful and practical application of computers.

Moreover, in various aspects, embodiments described herein can control real-world and/or tangible devices based on the disclosed teachings. For example, a computerized tool as described herein can electronically execute a real-world machine learning model (e.g., neural network) on a real-world digital artwork image, and the computerized tool can electronically generate a real-world non-fungible token based on results outputted by the real-world machine learning model.

It should be appreciated that the figures described herein are non-limiting examples of various embodiments.

FIG. 1 illustrates a high-level block diagram of an example, non-limiting system 100 that can facilitate detection of data duplication issues relating to generation of non-fungible tokens in accordance with one or more embodiments described herein. As shown, a non-fungible token plagiarism system 102 can be electronically integrated, via any suitable wired and/or wireless electronic connections, with a user device 104, a set of private caches 106, and/or a set of internet webpages 108.

In various embodiments, the user device 104 can be any suitable computing device that is operated by, owned by, and/or otherwise associated with any suitable user (e.g., any suitable entity, human and/or otherwise). For example, the user device 104 can be a laptop computer and/or a desktop computer. As another example, the user device 104 can be a smart device, such as a smart phone and/or a smart tablet. In any case, the user device 104 can electronically store, electronically maintain, electronically generate, electronically scan, and/or otherwise electronically capture a digital artwork image. In various instances, the digital artwork image can be considered as a piece of digital artwork that is created by the user of the user device 104 (e.g., the user can be considered as the artist of the digital artwork image; but if the digital artwork image is the result of plagiarism, then the user can be considered as a fraudster and/or plagiarist).

In various embodiments, the set of private caches 106 can include any suitable number of private caches, with each private cache being any suitable privately-accessible database and/or data structure (e.g., a cloud data base and/or data structure). In various aspects, each private cache can electronically store and/or otherwise electronically maintain some amount of cached digital artwork images, where each cached digital artwork image can be considered as a digital artwork image that pre-dates the digital artwork image captured and/or generated by the user device 104. In other words, each cached digital artwork image can be considered as a potential target from which the user of the user device 104 derived and/or plagiarized the digital artwork image.

In various embodiments, the set of internet webpages 108 can include any suitable number of internet webpages. In various aspects, each internet webpage can be any suitable publicly-accessible webpage that can electronically store and/or otherwise electronically maintain some amount of cached digital artwork images.

Accordingly, the set of private caches 106 and/or the set of internet webpages 108 can be considered as collectively storing and/or maintaining a set of cached digital artwork images. In various instances, the user of the user device 104 can desire to generate a non-fungible token to represent the digital artwork image. However, it can be desired to prevent such generation of the non-fungible token when the digital artwork image is the product of plagiarism. In various aspects, the non-fungible token plagiarism system 102 can address this problem by comparing, via machine learning, the digital artwork image with the set of cached digital artwork images that are stored/maintained by the set of private caches 106 and/or by the set of internet webpages 108.

In various embodiments, the non-fungible token plagiarism system 102 can comprise a processor 110 (e.g., computer processing unit, microprocessor) and a computer-readable memory 112 that is operably coupled to the processor 110. The memory 112 can store computer-executable instructions which, upon execution by the processor 110, can cause the processor 110 and/or other components of the non-fungible token plagiarism system 102 (e.g., receiver component 114, cache component 116, plagiarism component 118, score component 120, execution component 122, and/or pricing component 124) to perform one or more acts. In various embodiments, the memory 112 can store computer-executable components (e.g., receiver component 114, cache component 116, plagiarism component 118, score component 120, execution component 122, and/or pricing component 124), and the processor 110 can execute the computer-executable components.

In various embodiments, the non-fungible token plagiarism system 102 can comprise a receiver component 114, a cache component 116, a plagiarism component 118, a score component 120, an execution component 122, and/or a pricing component 124. In various aspects, as described herein, the receiver component 114 can electronically receive a digital artwork image from the user device 104. In various instances, as described herein, the cache component 116 can electronically access a set of cached digital artwork images that are collectively stored by the set of private caches 106 and/or by the set of internet webpages 108. In various cases, as described herein, the plagiarism component 118 can electronically execute a machine learning model on the digital artwork image and each of the set of cached digital artwork images, thereby yielding a set of plagiarism probabilities, where each plagiarism probability can represent a likelihood that the digital artwork image was derived/plagiarized from a given one of the set of cached digital artwork images. In various aspects, as described herein, the score component 120 can electronically compute an authenticity score based on the set of plagiarism probabilities, where the authenticity score can represent a level and/or likelihood of authenticity of the digital artwork image. In various instances, as described herein, the execution component 122 can electronically generate (and/or refrain from generating) a non-fungible token for the digital artwork image, based on the magnitude of the authenticity score. In various cases, as described herein, when the execution component 122 generates the non-fungible token, the pricing component 124 can electronically compute and/or adjust a price of the non-fungible token.

Figure 2:
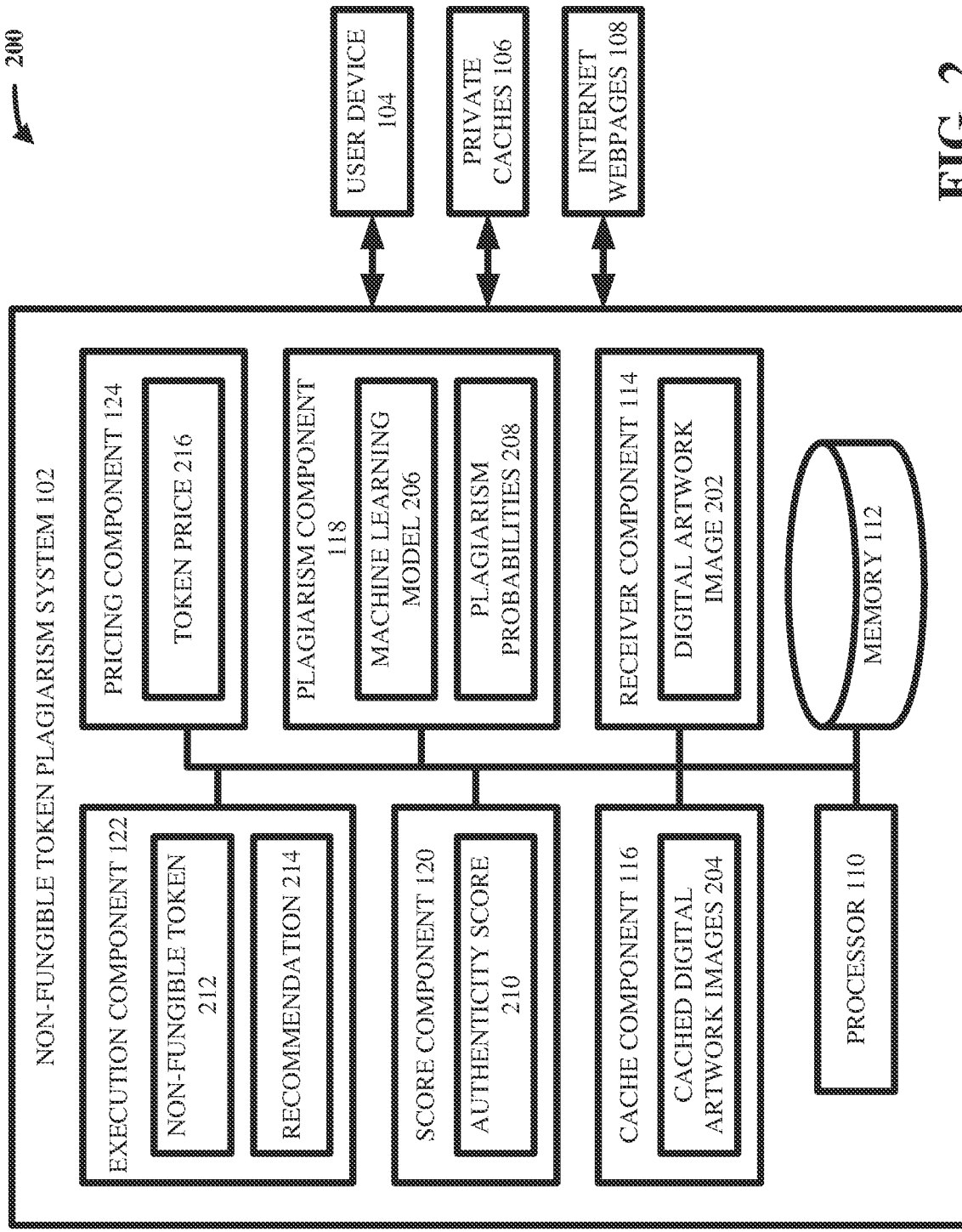
FIG. 2 illustrates a high-level block diagram of an example, non-limiting system including various additional components that facilitates detection of data duplication issues relating to generation of non-fungible tokens in accordance with one or more embodiments described herein.

FIG. 2 illustrates a high-level block diagram of an example, non-limiting system 200 including various additional components that can facilitate detection of data duplication issues relating to generation of non-fungible tokens in accordance with one or more embodiments described herein. As shown, the system 200 can, in some cases, comprise the same components as the system 100, and can further comprise a digital artwork image 202, a set of cached digital artwork images 204, a machine learning model 206, a set of plagiarism probabilities 208, an authenticity score 210, a non-fungible token 212, a recommendation 214, and/or a token price 216.

In various embodiments, the receiver component 114 can electronically receive and/or otherwise electronically access the digital artwork image 202. In various aspects, the digital artwork image 202 can be any suitable image (e.g., any suitable pixel array) that represents a piece of digital artwork that was created by the user of the user device 104. In various instances, the receiver component 114 can electronically retrieve the digital artwork image 202 from the user device 104 (e.g., the user device 104 can electronically transmit the digital artwork image 202 to the receiver component 114). In various other instances, the receiver component 114 can electronically retrieve the digital artwork image 202 from any other suitable centralized and/or decentralized data structure (not shown) (e.g., the user device 104 can electronically transmit the digital artwork image 202 to the centralized and/or decentralized data structure, and the receiver component 114 can electronically obtain the digital artwork image 202 from the centralized and/or decentralized data structure). In any case, the receiver component 114 can have electronic access to the digital artwork image 202, such that other components of the non-fungible token plagiarism system 102 can electronically interact with the digital artwork image 202.

In various embodiments, the cache component 116 can electronically access the set of cached digital artwork images 204. In various aspects, the set of cached digital artwork images 204 can include any suitable number of cached digital artwork images. In various instances, a cached digital artwork image can be any suitable image (e.g., any suitable pixel array) from which the digital artwork image 202 might have been derived and/or plagiarized. In various cases, the set of cached digital artwork images 204 can be collectively stored and/or maintained by the set of private caches 106 and/or by the set of internet webpages 108. Accordingly, the cache component 116 can electronically access the set of cached digital artwork images 204 by electronically interacting with the set of private caches 106 and/or with the set of internet webpages 108. This is further explained with respect to FIGS. 3-4.

FIG. 3 illustrates a high-level block diagram showing how the set of cached digital artwork images can be accessed from the set of private caches 106 in accordance with one or more embodiments described herein.

As shown, in various embodiments, the set of cached digital artwork images 204 can include n images, for any suitable positive integer n: a cached digital artwork image 1 to a cached digital artwork image n. As also shown, in some instances, the set of cached digital artwork images 204 can be considered as being the union of one or more private subsets of cached digital artwork images 302. In various cases, the one or more private subsets of cached digital artwork images 302 can include x private subsets of images, for any suitable positive integer x: a private subset 1 to a private subset x. Moreover, each private subset can include any suitable number cached digital artwork images, such that the union of all the one or more private subsets of cached digital artwork images 302 can be equal to the set of cached digital artwork images 204.

As further shown, in various aspects, each of the set of private caches 106 can electronically store and/or maintain a respectively corresponding one of the one or more private subsets of cached digital artwork images 302. For example, the set of private caches 106 can include x private caches: a private cache 1 to a private cache x. Furthermore, as shown, the private cache 1 can electronically store/maintain the private subset 1, and the private cache x can electronically store/maintain the private subset x. Thus, the set of private caches 106 can be considered as collectively storing the set of cached digital artwork images 204.

Accordingly, in various aspects, the cache component 116 can electronically access the set of cached digital artwork images 204 by electronically communicating with the set of private caches 106. For example, the cache component 116 can transmit, to the set of private caches 106, x electronic requests to access the x private subsets. That is, the cache component 116 can individually and/or independently request permission/authorization from each of the x private caches. In various instances, the cache component 116 can receive, from the set of private caches 106, x permission authorizations granting access to the x private subsets. In other words, each of the x private caches can individually and/or independently grant the cache component 116 permission/authorization. Accordingly, the cache component 116 can electronically access, in and/or from the set of private caches 106, the set of cached digital artwork images 204. That is, the cache component 116 can individually and/or independently access each of the x private subsets of cached digital artwork images.

Figure 4:
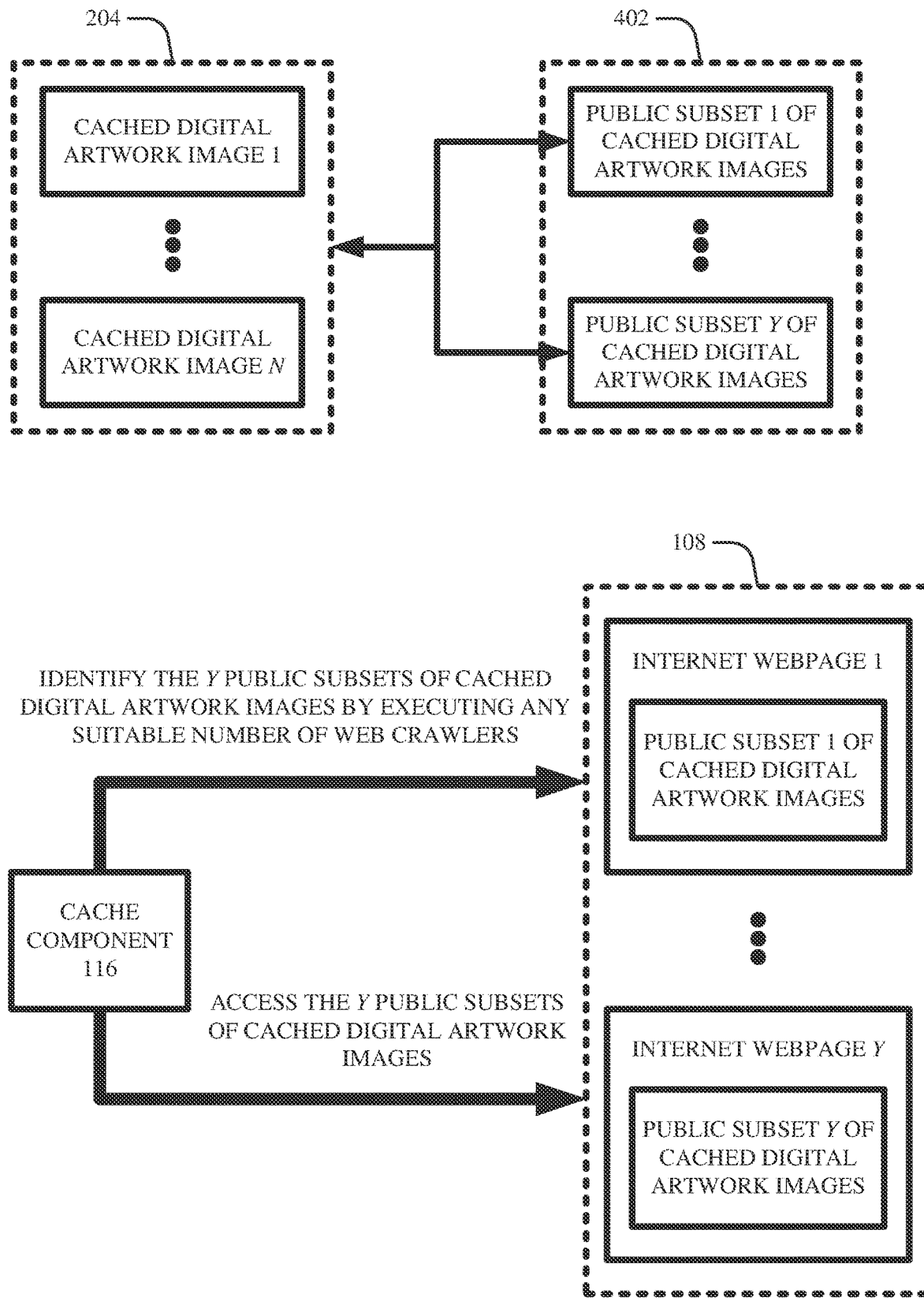
FIG. 4 illustrates a high-level block diagram showing how a set of cached digital artwork images can be accessed from a set of internet webpages in accordance with one or more embodiments described herein.

FIG. 4 illustrates a high-level block diagram showing how the set of cached digital artwork images 204 can be accessed from the set of internet webpages 108 in accordance with one or more embodiments described herein.

As mentioned above, the set of cached digital artwork images 204 can include n images, for any suitable positive integer n: a cached digital artwork image 1 to a cached digital artwork image n. As shown, in some instances, the set of cached digital artwork images 204 can be considered as being the union of one or more public subsets of cached digital artwork images 402. In various cases, the one or more public subsets of cached digital artwork images 402 can include y public subsets of images, for any suitable positive integer y: a public subset 1 to a public subset y. Moreover, each public subset can include any suitable number cached digital artwork images, such that the union of all the one or more public subsets of cached digital artwork images 402 can be equal to the set of cached digital artwork images 204.

In various aspects, as shown, each of the set of internet webpages 108 can electronically store and/or maintain a respectively corresponding one of the one or more public subsets of cached digital artwork images 402. For example, the set of internet webpages 108 can include y internet webpages: an internet webpage 1 to an internet webpage y. Furthermore, as shown, the internet webpage 1 can electronically store/maintain the public subset 1, and the internet webpage y can electronically store/maintain the public subset y. Thus, the set of internet webpages 108 can be considered as collectively storing the set of cached digital artwork images 204.

Accordingly, in various cases, the cache component 116 can electronically access the set of cached digital artwork images 204 by electronically interacting with the set of internet webpages 108. For example, the cache component 116 can identify the set of internet webpages 108 by electronically executing and/or implementing any suitable number of web crawlers. That is, the web crawlers can identify each of they internet webpages by crawling across the internet. In various aspects, the cache component 116 can then electronically access the set of cached digital artwork images 204 from the set of internet webpages 108. In other words, the cache component 116 can individually and/or independently visit each of they internet webpages and can electronically copy and/or download they public subsets of cached digital artwork images.

Although not explicitly shown in the figures, those having ordinary skill in the art will appreciate that, in various cases, some of the set of cached digital artwork images 204 can be stored/maintained in the set of private caches 106, while others of the set of cached digital artwork images 204 can be stored/maintained in the set of internet webpages 108. In such case, the cache component 116 can interact with both the set of private caches 106 and the set of internet webpages 108 to obtain/access the set of cached digital artwork images 204.

Referring back to FIG. 2, in various embodiments, the plagiarism component 118 can electronically store, electronically maintain, electronically control, and/or otherwise electronically access the machine learning model 206. In various aspects, the machine learning model 206 can exhibit any suitable artificial intelligence architecture, as desired. For example, the machine learning model 206 can exhibit a deep learning neural network architecture. In such case, the machine learning model 206 can include any suitable number of layers (e.g., input layer, one or more hidden layers, output layer), can include any suitable numbers of neurons in various layers (e.g., different layers can have the same and/or different numbers of neurons as each other), can include any suitable activation functions in various neurons (e.g., sigmoid, softmax, hyperbolic tangent, rectified linear unit), and/or can include any suitable interneuron connections (e.g., forward connections, skip connections, recurrent connections). For instance, the machine learning model 206 can be a convolutional neural network. As various other non-limiting examples, the machine learning model 206 can be a support vector machine, a naïve Bayes model, a logistic regression model, and/or a tree-based model.

In any case, the plagiarism component 118 can electronically execute the machine learning model 206 on the digital artwork image 202 and the set of cached digital artwork images 204, thereby yielding the set of plagiarism probabilities 208. This is further discussed with respect to FIGS. 5-7.

Figure 5:
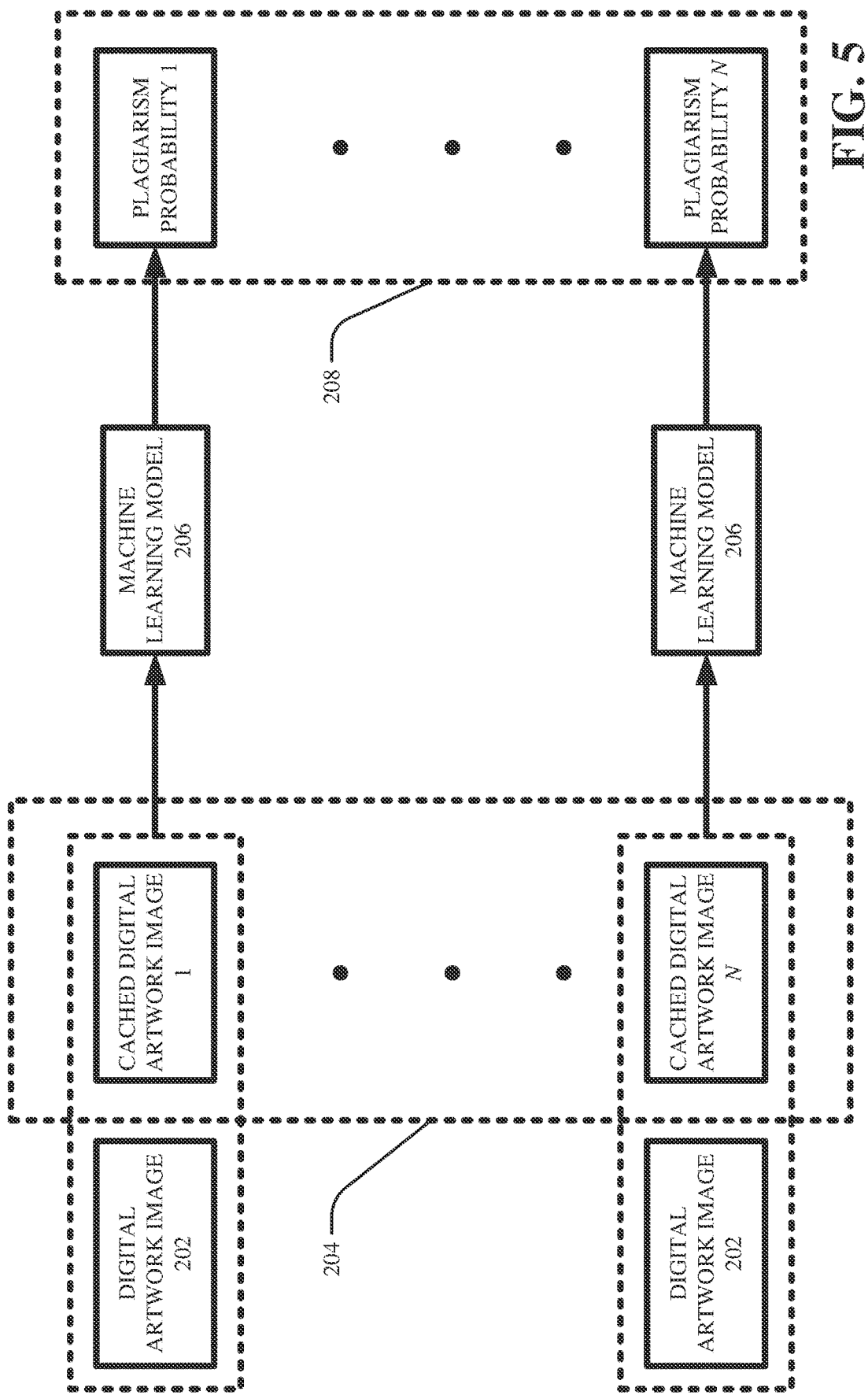
FIGS. 5-7 illustrate high-level block diagrams showing how a set of plagiarism probabilities can be generated by a machine learning model based on a set of cached digital artwork images in accordance with one or more embodiments described herein.
Figure 6:
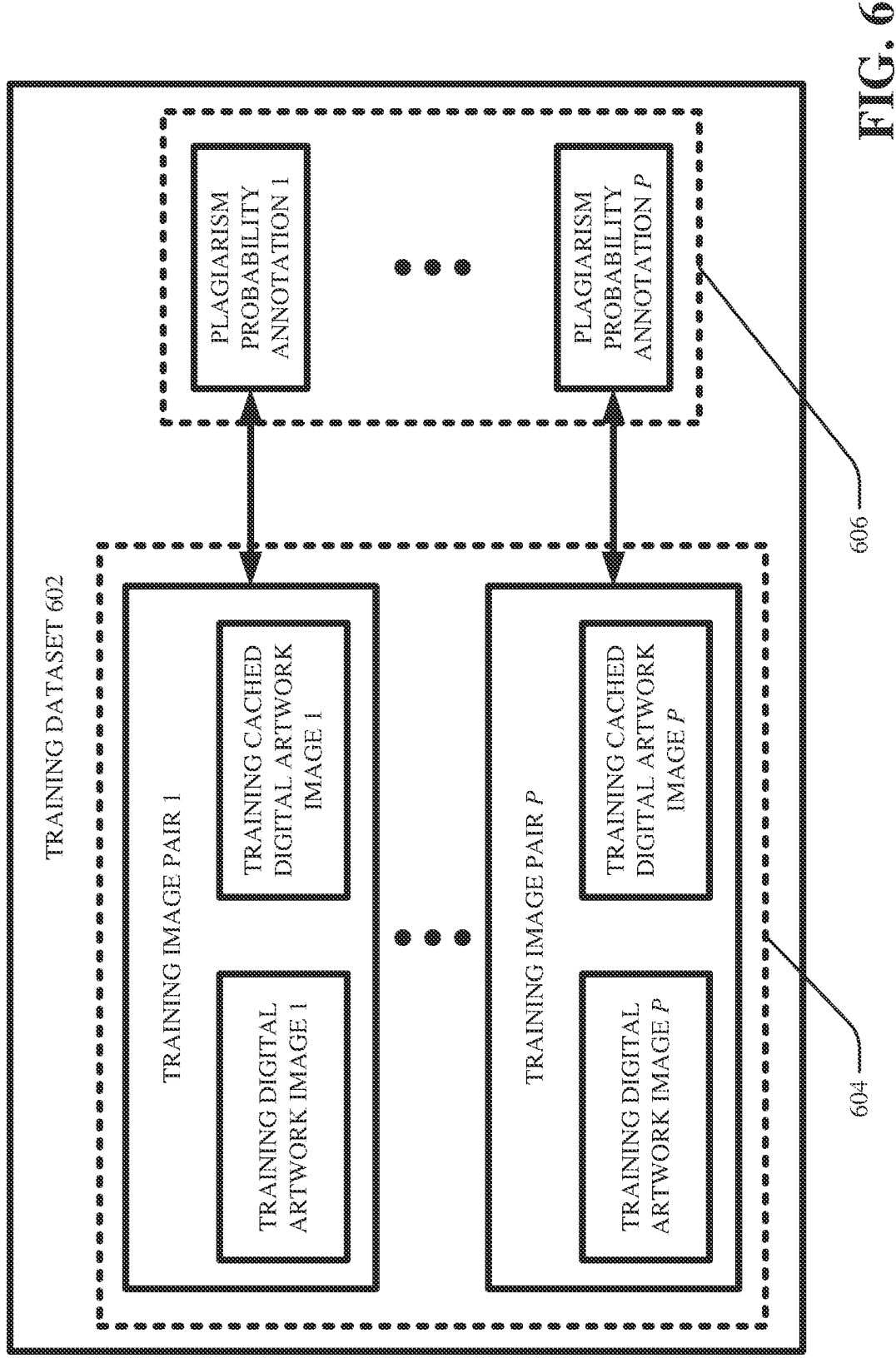
Figure 7:
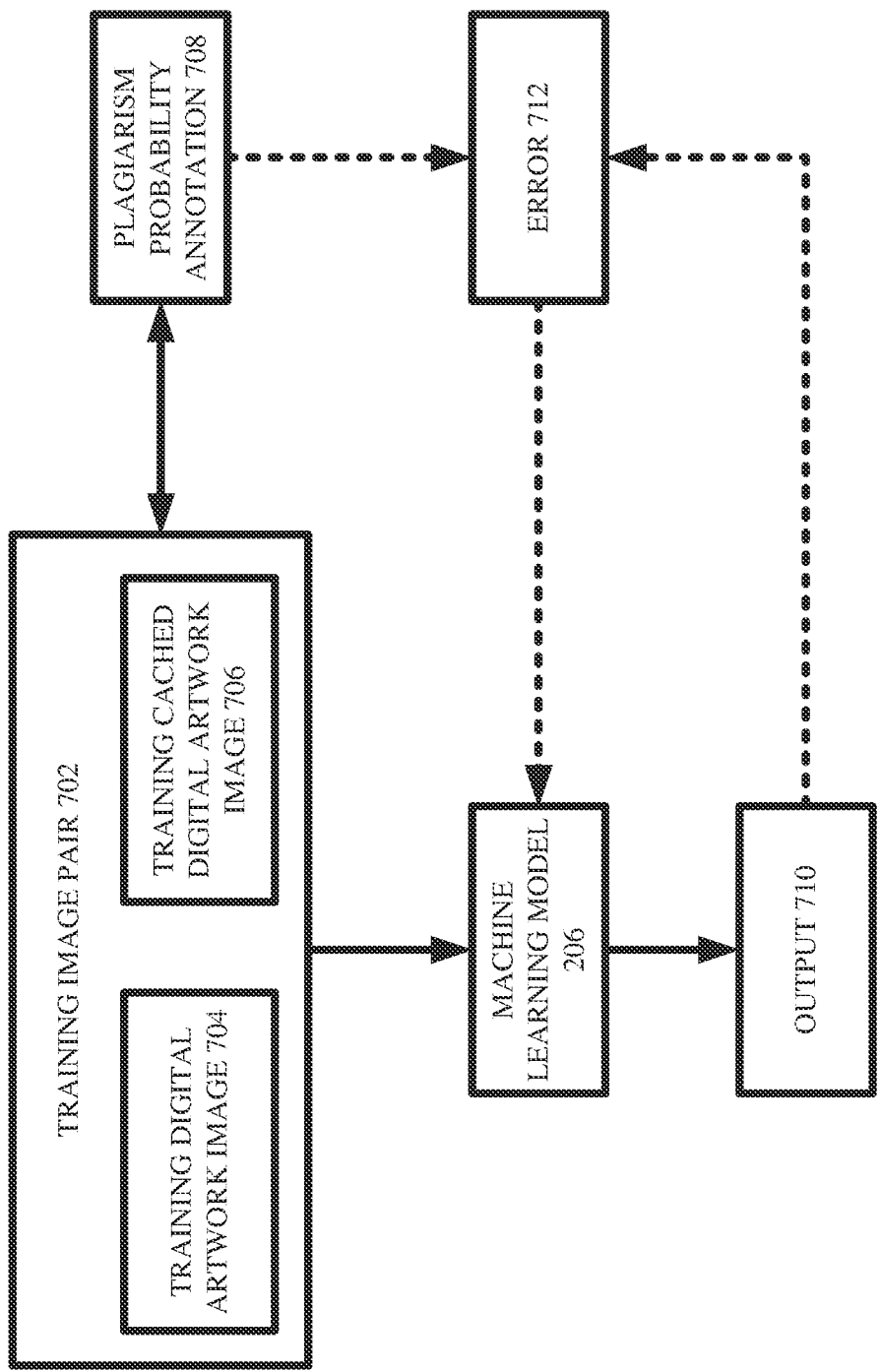

FIGS. 5-7 illustrate high-level block diagrams showing how the set of plagiarism probabilities 208 can be generated by the machine learning model 206 based on the set of cached digital artwork images 204 in accordance with one or more embodiments described herein.

As shown in FIG. 5, the set of plagiarism probabilities 208 can respectively correspond to the set of cached digital artwork images 204. In other words, the set of plagiarism probabilities 208 can include n probabilities: a plagiarism probability 1 to a plagiarism probability n. More specifically, and as shown in FIG. 5, the machine learning model 206 can be configured to receive as input both the digital artwork image 202 and one of the set of cached digital artwork images 204, and the machine learning model 206 can be further configured to produce as output one of the set of plagiarism probabilities 208 based on such input.

For example, the machine learning model 206 can receive as input the digital artwork image 202 and the cached digital artwork image 1, and the machine learning model 206 can produce as output the plagiarism probability 1. More specifically, if the machine learning model 206 exhibits a deep learning neural network architecture, then the plagiarism component 118 can feed both the digital artwork image 202 and the cached digital artwork image 1 to an input layer of the machine learning model 206, the digital artwork image 202 and the cached digital artwork image 1 can complete a forward pass through one or more hidden layers of the machine learning model 206, and an output layer of the machine learning model 206 can produce as output the plagiarism probability 1 based on activations generated by the one or more hidden layers. In any case, the plagiarism probability 1 can be a scalar that represents a likelihood and/or probability that the digital artwork image 202 (and/or a portion thereof) was derived (e.g., plagiarized) from the cached digital artwork image 1.

Similarly, the machine learning model 206 can receive as input the digital artwork image 202 and the cached digital artwork image n, and the machine learning model 206 can produce as output the plagiarism probability n. More specifically, if the machine learning model 206 exhibits a deep learning neural network architecture, then the plagiarism component 118 can feed both the digital artwork image 202 and the cached digital artwork image n to the input layer of the machine learning model 206, the digital artwork image 202 and the cached digital artwork image n can complete a forward pass through the one or more hidden layers of the machine learning model 206, and the output layer of the machine learning model 206 can produce as output the plagiarism probability n based on activations generated by the one or more hidden layers. In any case, the plagiarism probability n can be a scalar that represents a likelihood and/or probability that the digital artwork image 202 (and/or a portion thereof) was derived (e.g., plagiarized) from the cached digital artwork image n.

In this way, the plagiarism component 118 can generate the set of plagiarism probabilities 208.

In order to facilitate such functionality, the machine learning model 206 can first be trained. In various aspects, this can be facilitated as described with respect to FIGS. 6-7.

In various embodiments, FIG. 6 depicts a training dataset 602. In various aspects, the training dataset 602 can include a set of training image pairs 604 and a set of plagiarism probability annotations 606 that respectively correspond to the set of training image pairs 604. As shown, the set of training image pairs 604 can include p training image pairs, for any suitable positive integer p: a training image pair 1 to a training image pair p. Accordingly, the set of plagiarism probability annotations 606 can likewise include p annotations: a plagiarism probability annotation 1 to a plagiarism probability annotation p. In various aspects, as shown, the training image pair 1 can include a training digital artwork image 1 (e.g., any suitable pixel array) and a training cached digital artwork image 1 (e.g., any suitable pixel array), and the training image pair 1 can correspond to the plagiarism probability annotation 1. In other words, the plagiarism probability annotation 1 can be a scalar that represents a ground-truth and/or known probability indicating how likely it is that the training digital artwork image 1 was derived (e.g., plagiarized) from the training cached digital artwork image 1. Likewise, as shown, the training image pair p can include a training digital artwork image p (e.g., any suitable pixel array) and a training cached digital artwork image p (e.g., any suitable pixel array), and the training image pair p can correspond to the plagiarism probability annotation p. In other words, the plagiarism probability annotation p can be a scalar that represents a ground-truth and/or known probability indicating how likely it is that the training digital image p was derived (e.g., plagiarized) from the training cached digital artwork image p.

In various instances, the internal parameters (e.g., weights, biases) of the machine learning model 206 can be initialized in any suitable fashion (e.g., random initialization), and the plagiarism component 118 can electronically train the machine learning model 206 on the training dataset 602. This is explained more with respect to FIG. 7.

As shown in FIG. 7, the plagiarism component 118 can electronically select a training image pair 702 from the training dataset 602. In various cases, the training image pair 702 can include a training digital artwork image 704 and a training cached digital artwork image 706, and the training image pair 702 can correspond to a plagiarism probability annotation 708. In various aspects, the plagiarism component 118 can electronically feed the training image pair 702 to the machine learning model 206 as input. In various instances, this can cause the machine learning model 206 to produce an output 710 based on the training image pair 702 (e.g., based on the training digital artwork image 704 and the training cached digital artwork image 706). As a non-limiting example, suppose that the machine learning model 206 is a deep learning neural network. In such case, an input layer of the machine learning model 206 can receive the training image pair 702. In various instances, the training image pair 702 can complete a forward pass through one or more hidden layers of the machine learning model 206, according to the interneuron connections of the machine learning model 206 (e.g., forward connections, skip connections, recurrent connections). Finally, in various aspects, an output layer of the machine learning model 206 can compute the output 710, based on activations provided by the one or more hidden layers. In any case, the output 710 can be considered as a scalar that represents an inferred likelihood that the training digital artwork image 704 was derived/plagiarized from the training cached digital artwork image 706. In contrast, the plagiarism probability annotation 708 can be a scalar that represents a ground-truth and/or known likelihood that the training digital artwork image 704 was derived/plagiarized from the training cached digital artwork image 706. Note that, if the machine learning model 206 has so far undergone no and/or little training, the output 710 can be very inaccurate. In any case, the plagiarism component 118 can electronically compute an error 712 (e.g., cross-entropy loss) between the output 710 and the plagiarism probability annotation 708, and the plagiarism component 118 can update the internal parameters of the machine learning model 206 by applying backpropagation based on the error 712.

In various aspects, the plagiarism component 118 can repeat the above-described training procedure for each of the training image pairs in the training dataset 602, with the ultimate result being that the internal parameters of the machine learning model 206 can become iteratively optimized for accurately inferring plagiarism probabilities based on inputted image pairs. Those having ordinary skill in the art will appreciate that any suitable training batch sizes can be implemented, any suitable training termination criteria can be implemented, and/or any suitable error/loss function can be implemented (e.g., triplet loss).

The machine learning model 206 has so far been mainly described as being configured to receive as input two pixel-arrays: the digital artwork image 202 and one of the set of cached digital artwork images 204. However, in some instances, it can be desired to make less than an entirety of the digital artwork image 202 available to the machine learning model 206. In such cases, the machine learning model 206 can be configured to receive as input one of the set of cached digital artwork images 204 and one or more fragments of the digital artwork image 202. More specifically, one or more pixel patches of any suitable shape and/or size can be cropped out of the digital artwork image 202, and such one or more pixel patches can be considered as the one or more fragments of the digital artwork image 202.

In some aspects, if two or more pixel patches (e.g., two or more fragments) are cropped out of the digital artwork image 202, then such two or more pixel patches can be associated with coordinates and/or distance vectors that indicate how such two or more pixel patches are relatively spaced and/or arranged in the digital artwork image 202 with respect to each other. As a non-limiting example, suppose that the plagiarism component 118 crops three pixel patches out of the digital artwork image 202: a first pixel patch, a second pixel patch, and a third pixel patch. In such case, the plagiarism component 118 can generate three coordinate tuples (e.g., specifying the location of the first pixel patch, specifying the location of the second pixel patch, and specifying the location of the third pixel patch) and/or three distance vectors (e.g., specifying a distance and direction that separate the first pixel patch from the second pixel patch, specifying a distance and direction that separate the second pixel patch from the third pixel patch, and specifying a distance and direction that separate the first pixel patch from the third pixel patch), which locations and/or distance vectors define and/or indicate the respective spatial arrangement of the three pixels patches with respect to each other.

In any of such cases, the machine learning model 206 can be configured to receive as input a cached digital artwork image and to also receive as input the one or more fragments (and/or any coordinate tuples and/or distance vectors associated with such fragments) of the digital artwork image 202, rather than being configured to receive as input the entire digital artwork image 202. In such cases, the output of the machine learning model 206 can be a plagiarism probability indicating a likelihood that the one or more fragments were derived (e.g., plagiarized) from the inputted cached digital artwork image. Those having ordinary skill in the art will appreciate that the machine learning model 206 in such embodiments can be trained via a supervised training procedure, analogous to the training procedure described with respect to FIGS. 6-7 (e.g., instead of training image pairs, each training input that has an associated plagiarism probability annotation can comprise a training cached digital artwork image and one or more training image fragments).

Figure 8:
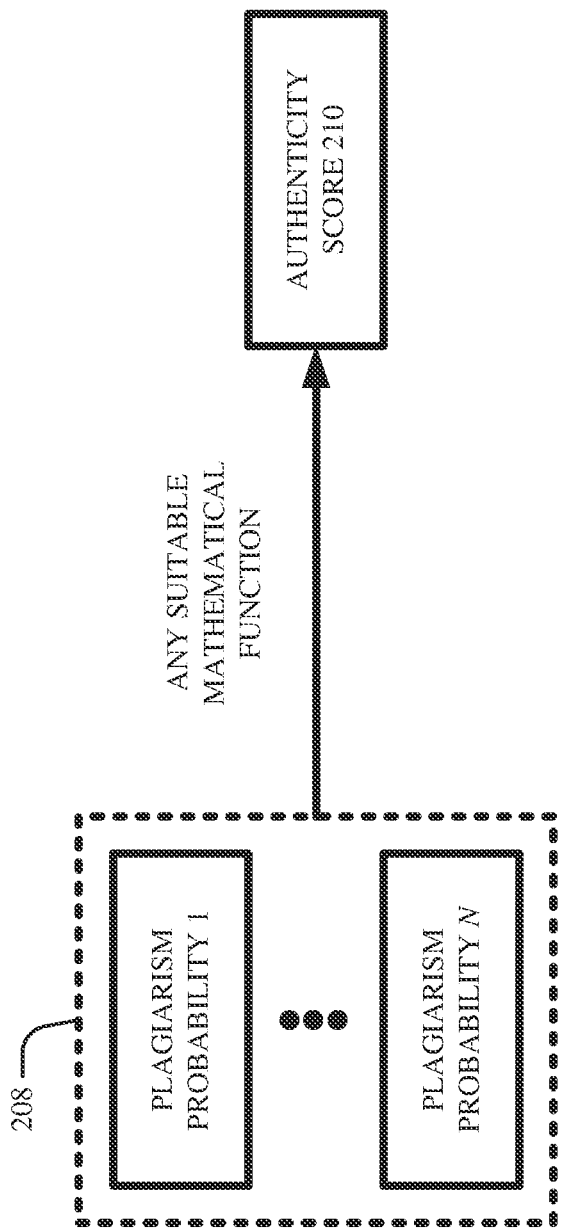
FIG. 8 illustrates a high-level block diagram showing how an authenticity score can be generated based on a set of plagiarism probabilities in accordance with one or more embodiments described herein.

Once the plagiarism component 118 has generated the set of plagiarism probabilities 208, in various embodiments, the score component 120 can electronically compute the authenticity score 210, based on the set of plagiarism probabilities 208. This is further shown with respect to FIG. 8. As shown in FIG. 8, the score component 120 can, in some aspects, electronically apply any suitable mathematical function and/or any suitable combination of mathematical functions (e.g., weighted average function, exponential functions, logarithm functions, polynomial functions, sinusoidal functions) which can take as arguments the set of plagiarism probabilities 208 and which can provide as output the authenticity score 210. As a non-limiting example, the score component 120 can identify a maximum plagiarism probability in the set of plagiarism probabilities 208, the score component 120 can subtract such maximum plagiarism probability from unity (e.g., subtract such maximum plagiarism probability from 1 and/or from 100%), and the result of such subtraction can be considered as the authenticity score 210. As another non-limiting example, the score component 120 can electronically store, maintain, control, and/or otherwise access a machine learning model (not shown) that can be configured and/or trained to receive as input the set of plagiarism probabilities 208 and to generate as output the authenticity score 210. Those having ordinary skill in the art will appreciate that such a machine learning model can be trained in supervised, unsupervised, and/or reinforcement learning fashion. In any case, the authenticity score 210 can be a scalar that can represent a level and/or likelihood of authenticity of the digital artwork image 202 (e.g., representing whether the digital artwork image 202 is likely to be authentic given the set of cached digital artwork images 204).

Referring back to FIG. 2, in various embodiments, the execution component 122 can initiate any suitable electronic and/or computerized actions, based on the authenticity score 210. For instance, in various aspects, the execution component 122 can electronically compare the authenticity score 210 with any suitable threshold authenticity value (not shown). When the execution component 122 determines that the authenticity score 210 satisfies the threshold authenticity value, the execution component 122 can electronically generate, via any suitable cryptographic techniques, the non-fungible token 212 to represent the digital artwork image 202. In other words, if the authenticity score 210 indicates that the digital artwork image 202 is sufficiently likely to be authentic, then the execution component 122 can infer that the user of the user device 104 is not a fraudster and/or a plagiarist, and so the execution component 122 can electronically create the non-fungible token 212 for the digital artwork image 202. In contrast, when the execution component 122 determines that the authenticity score 210 fails to satisfy the threshold authenticity value, the execution component 122 can refrain from electronically generating the non-fungible token 212. In other words, if the authenticity score 210 indicates that the digital artwork image 202 is not sufficiently likely to be authentic, then the execution component 122 can infer that the user of the user device 104 is a fraudster and/or a plagiarist, and so the execution component 122 can prevent the non-fungible token 212 from being created for the digital artwork image 202. In this way, fraudsters and/or plagiarists can be impeded from illegitimately creating non-fungible tokens.

In various other embodiments, rather than generating and/or refraining from generating the non-fungible token 212, the execution component 122 generate the recommendation 214 based on the authenticity score 210. For example, when the execution component 122 determines that the authenticity score 210 satisfies the threshold authenticity value, the execution component 122 can electronically generate the recommendation 214, where the recommendation 214 can be an electronic message and/or notification indicating that the non-fungible token 212 should be created for the digital artwork image 202 due to absence of suspected plagiarism. In contrast, when the execution component 122 determines that the authenticity score 210 fails to satisfy the threshold authenticity value, the execution component 122 can electronically generate the recommendation 214, where the recommendation 214 can be an electronic message and/or notification indicating that the non-fungible token 212 should not be created for the digital artwork image 202 due to presence of suspected plagiarism. In any case, the execution component 122 can electronically transmit the recommendation 214 to any suitable computing device (not shown), as desired. In this way, fraudsters and/or plagiarists can be impeded from illegitimately creating non-fungible tokens.

In various embodiments in which the execution component 122 electronically generates the non-fungible token 212, the non-fungible token plagiarism system 102 can repeat various of the above-described functionalities, so as to update the authenticity score 210. For example, it can be the case that the set of cached digital artwork images 204 changes over time (e.g., new images can be added by the set of private caches 106 and/or by the set of internet webpages 108). Accordingly, the cache component 116 can continually access the set of cached digital artwork images 204 so as to become apprised of any such changes, the plagiarism component 118 can continually compute and/or update the set of plagiarism probabilities 208 based on the set of cached digital artwork images 204, and the score component 120 can continually compute and/or update the authenticity score 210 based on the set of plagiarism probabilities 208. Thus, it can be the case that the execution component 122 determines, at a first point in time, that the authenticity score 210 satisfies the threshold authenticity value, in which case the execution component 122 can generate the non-fungible token 212. However, it can also be the case that the execution component 122 determines, at a second point in time that is later and/or after the first point in time, that the authenticity score 210 no longer satisfies the threshold authenticity value. In such case (e.g., after the non-fungible token 212 has already been created), the execution component 122 can electronically delete, cancel, delist, and/or otherwise deactivate the non-fungible token 212, and/or the execution component 122 can electronically mark/label the non-fungible token 212 as no longer trustworthy.

Although not explicitly shown in the figures, the non-fungible token 212 can, in some cases, exhibit smart functionality. Accordingly, the non-fungible token 212 can, in various aspects, be programmed to automatically delete, cancel, delist, and/or deactivate itself and/or otherwise mark/label itself as no longer trustworthy, if the authenticity score 210 ever fails to satisfy the threshold authenticity value.

Figure 9:
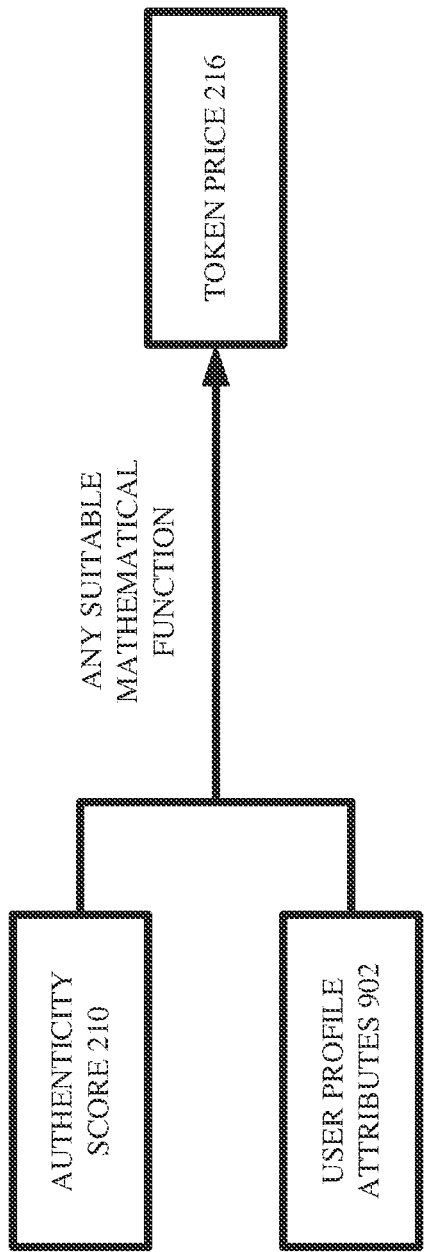
FIG. 9 illustrates a high-level block diagram showing how a token price can be computed based on an authenticity score and a set of user profile attributes in accordance with one or more embodiments described herein.

In various embodiments, if the execution component 122 has generated the non-fungible token 212 (e.g., if the authenticity score 210 satisfies the threshold authenticity value), then the pricing component 124 can compute the token price 216, based on the authenticity score 210 and/or based on any other suitable data pertaining to the user of the user device 104. This is further shown with respect to FIG. 9. As shown in FIG. 9, the pricing component 124 can, in some aspects, electronically apply any suitable mathematical function and/or any suitable combination of mathematical functions (e.g., weighted average function, exponential functions, logarithm functions, polynomial functions, sinusoidal functions) which can take as arguments the authenticity score 210 and/or a set of user profile attributes 902 (e.g., which can include risk scores associated with the user of the user device 104, demographics of the user of the user device 104, transaction histories of the user of the user device 104), and that can produce as output the token price 216. In other aspects, the pricing component 124 can electronically store, maintain, control, and/or otherwise access a machine learning model (not shown) that can be configured and/or trained to receive as input the authenticity score 210 and/or the set of user profile attributes 902 and to produce as output the token price 216. Those having ordinary skill in the art will appreciate that such a machine learning model can be trained in supervised, unsupervised, and/or reinforcement learning fashion. In any case, the token price 216 can be a scalar that can represent a monetary value of the digital artwork image 202 and thus of the non-fungible token 212.

In various embodiments, the value of the digital artwork image 202 and thus of the non-fungible token 212 can diminish over time, due to an increased likelihood that the digital artwork image 202 might be targeted by fraudsters and/or plagiarists. Accordingly, in various aspects, the pricing component 124 can electronically reduce and/or depreciate the token price 216 over any suitable time period. In some cases, the time period can be considered as a countdown until the digital artwork image 202 is likely to become the target of plagiarism. In some cases, the pricing component 124 can implement linear depreciation over the time period. In other cases, the pricing component 124 can implement exponential depreciation over the time period. In various aspects, any other suitable depreciation technique can be implemented. In some instances, the execution component 122 can electronically delete, cancel, delist, and/or otherwise deactivate the non-fungible token 212 and/or otherwise mark/label the non-fungible token 212 as no longer trustworthy, upon expiration and/or elapsing of the time period.

Figure 10:
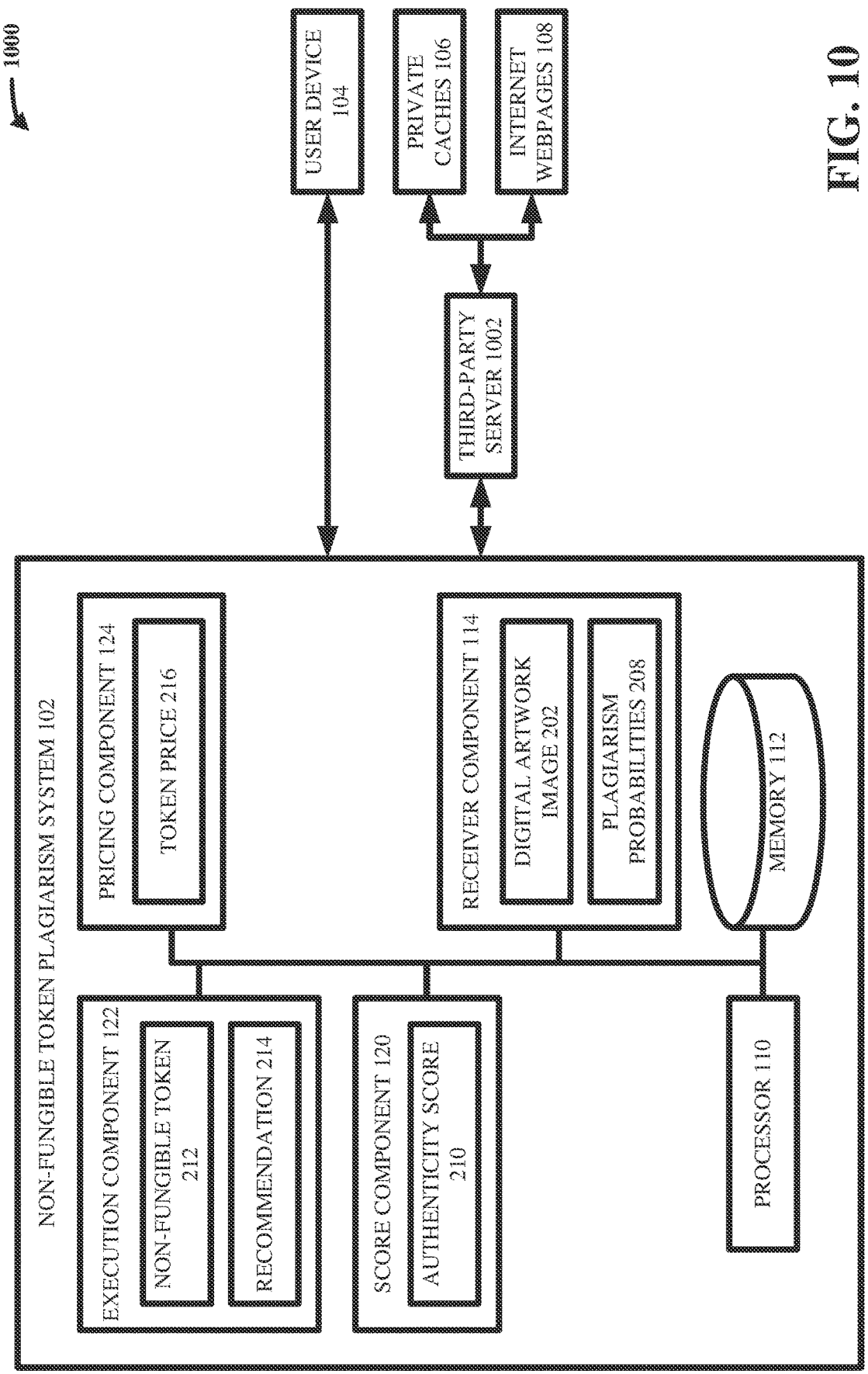
FIG. 10 illustrates a high-level block diagram of an example, non-limiting system including a third-party server that facilitates detection of data duplication issues relating to generation of non-fungible tokens in accordance with one or more embodiments described herein.

FIG. 10 illustrates a high-level block diagram of an example, non-limiting system 1000 including a third-party server that can facilitate detection of data duplication issues relating to generation of non-fungible tokens in accordance with one or more embodiments described herein. As shown, the system 1000 can, in some cases, comprise some of the same components as the system 200, and can comprise a third-party server 1002.

As shown in FIG. 10, in some embodiments, the functionalities that are performed by the cache component 116 and/or the machine learning model 206 can be outsourced to the third-party server 1002. In various aspects, the third-party server 1002 can be any suitable computing device and/or any suitable combination of computing devices that are separate from and/or otherwise unassociated with the non-fungible token plagiarism system 102. As shown, the third-party server 1002 can be electronically integrated, via any suitable wired and/or wireless electronic connections, with the set of private caches 106 and/or with the set of internet webpages 108. Accordingly, in various instances, the third-party server 1002 can electronically access the set of cached digital artwork images 204 by electronically interacting with the set of private caches 106 and/or with the set of internet webpages 108. Moreover, in various cases, the third-party server 1002 can store, maintain, control, and/or otherwise access the machine learning model 206. Accordingly, in various cases, the receiver component 114 can electronically obtain the digital artwork image 202, and the receiver component 114 can electronically transmit the digital artwork image 202 (and/or one or more fragments of the digital artwork image 202 along with coordinate tuples and/or distance vectors) to the third-party server 1002. In various aspects, the third-party server 1002 can electronically generate the set of plagiarism probabilities 208 by executing the machine learning model 206, and the receiver component 114 can electronically retrieve the set of plagiarism probabilities 208 from the third-party server 1002. The remaining components of the non-fungible token plagiarism system 102 can function as described above.

Figure 11:
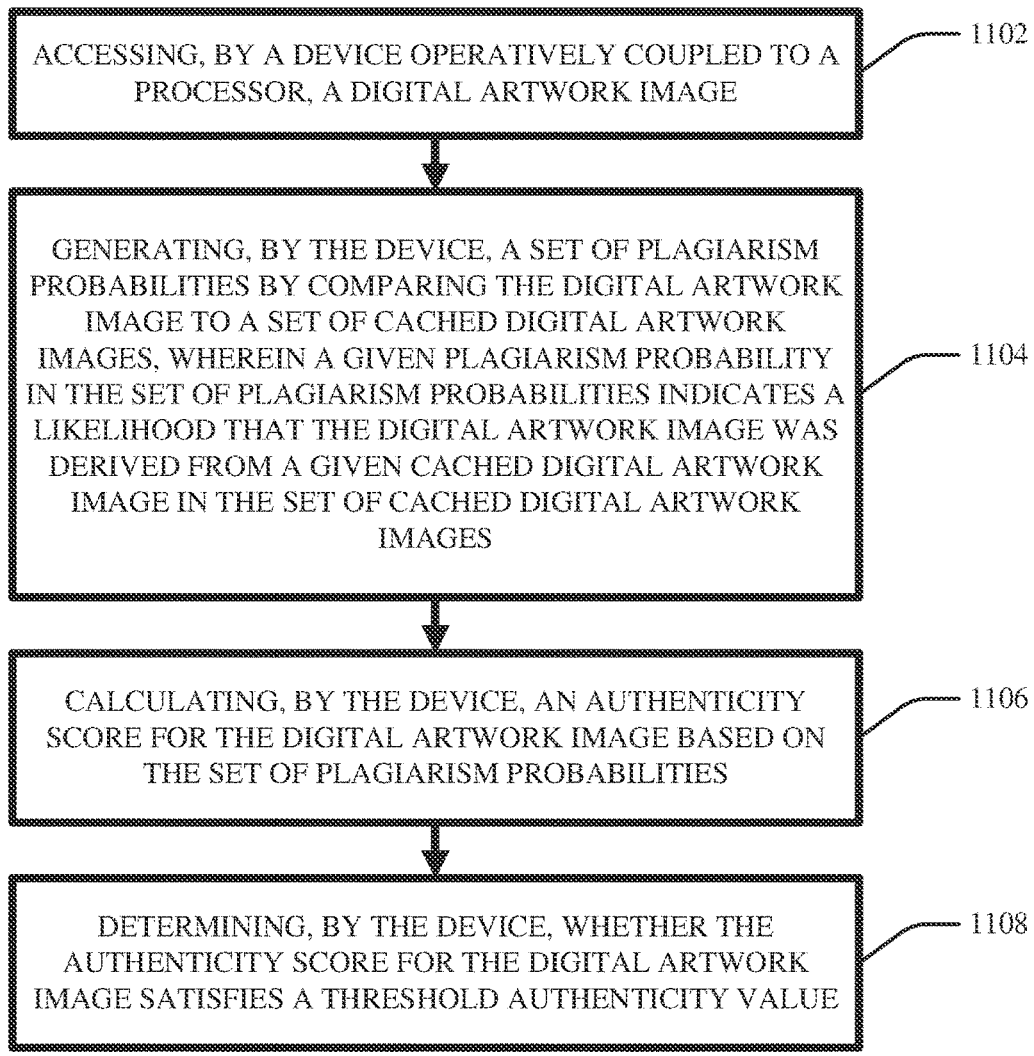
FIGS. 11-12 illustrate high-level flow diagrams of example, non-limiting computer-implemented methods that facilitate detection of data duplication issues relating to generation of non-fungible tokens in accordance with one or more embodiments described herein.
Figure 12:
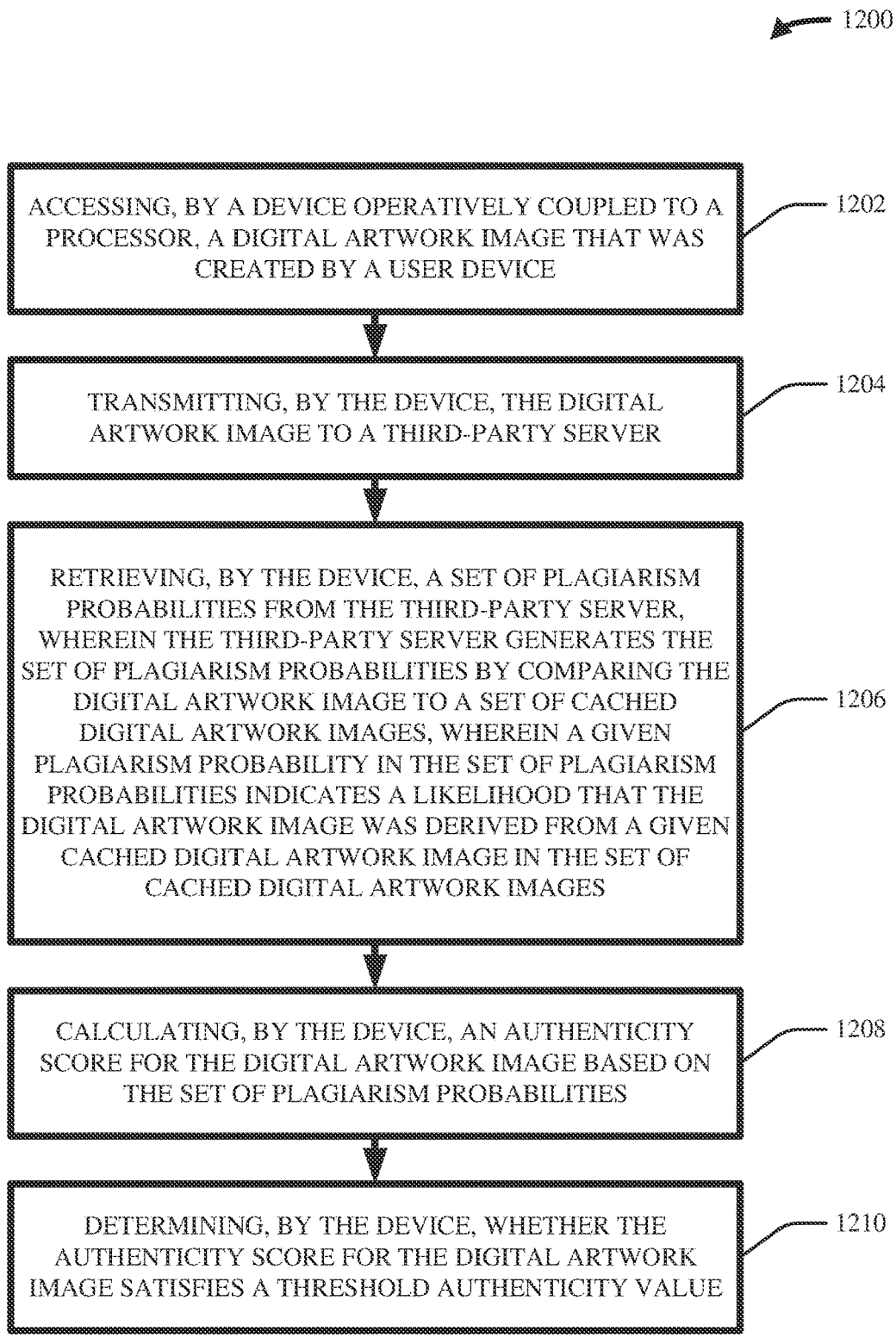

FIGS. 11-12 illustrate high-level flow diagrams of example, non-limiting computer-implemented methods 1100 and 1200 that can facilitate detection of data duplication issues relating to generation of non-fungible tokens in accordance with one or more embodiments described herein.

First, consider the computer-implemented method 1100. In various embodiments, act 1102 can include accessing, by a device (e.g., via 114) operatively coupled to a processor, a digital artwork image (e.g., 202). In various cases, the digital artwork image can be retrieved from a user device (e.g., 104) that captured, scanned, and/or created the digital artwork image.

In various aspects, act 1104 an include generating, by the device (e.g., via 118), a set of plagiarism probabilities (e.g., 208) by comparing the digital artwork image to a set of cached digital artwork images (e.g., 204). In various cases, a given plagiarism probability in the set of plagiarism probabilities can indicate a likelihood that the digital artwork image was derived (e.g., plagiarized) from a given cached digital artwork image in the set of cached digital artwork images. As mentioned above, the set of cached digital artwork images can be obtained by electronically interacting with a set of private caches (e.g., 106) and/or with a set of internet webpages (e.g., 108).

In various instances, act 1106 can include calculating, by the device (e.g., via 120), an authenticity score (e.g., 210) for the digital artwork image based on the set of plagiarism probabilities. In various cases, the authenticity score can be equal to any suitable mathematical function that takes as arguments any of the set of plagiarism probabilities.

In various aspects, act 1108 can include determining, by the device (e.g., via 122), whether the authenticity score for the digital artwork image satisfies a threshold authenticity value.

Although not explicitly shown in FIG. 11, the computer-implemented method 1100 can further include: when the authenticity score satisfies the threshold authenticity value, generating, by the device (e.g., via 122) a non-fungible token (e.g., 212) to represent the digital artwork image; and when the authenticity score fails to satisfy the threshold authenticity value, refraining, by the device (e.g., via 122), from generating the non-fungible token.

Although not explicitly shown in FIG. 11, the computer-implemented method 1100 can further comprise: when the authenticity score satisfies the threshold authenticity value, generating, by the device (e.g., via 122), a first electronic alert (e.g., 214) that indicates that a non-fungible token should be generated to represent the digital artwork image due to an absence of suspected plagiarism; and when the authenticity score fails to satisfy the threshold authenticity value, generating, by the device (e.g., via 122) a second electronic alert (e.g., 214) that indicates that the non-fungible token should not be generated to represent the digital artwork image due to suspected plagiarism.

Although not explicitly shown in FIG. 11, the generating the set of plagiarism probabilities by comparing the digital artwork image to the set of cached digital artwork images can include: respectively executing, by the device (e.g., via 118) a trained machine learning model (e.g., 206) on each of the set of cached digital artwork images. In various cases, the trained machine learning model can receive as input the digital artwork image and can also receive as input the given cached digital artwork image, and the trained machine learning model can produce as output the given plagiarism probability. In various other cases, the trained machine learning model can receive as input two or more fragments of the digital artwork image that are separated by predetermined distances and can also receive as input the given cached digital artwork image, and the trained machine learning model can produce as output the given plagiarism probability.

Although not explicitly shown in FIG. 11, the computer-implemented method 1100 can further include: transmitting, by the device (e.g., via 116), one or more electronic requests to one or more private caches (e.g., 106), wherein the one or more private caches collectively store the set of cached digital artwork images; receiving, by the device (e.g., via 116) and from the one or more private caches, one or more electronic permission authorizations in response to the one or more electronic requests; and accessing, by the device (e.g., via 116), the set of cached digital artwork images in response to the one or more electronic permission authorizations (e.g., as shown in FIG. 3).

Although not explicitly shown in FIG. 11, the computer-implemented method 1100 can further include: executing, by the device (e.g., via 116), one or more web crawlers on the Internet, wherein the one or more web crawlers can collectively identify the set of cached digital artwork images in one or more web pages of the Internet (e.g., 108); and accessing, by the device (e.g., 116), the set of cached digital artwork images (e.g., as shown in FIG. 4).

Now, consider the computer-implemented method 1200. In various embodiments, act 1202 can include accessing, by a device (e.g., via 114) operatively coupled to a processor, a digital artwork image (e.g., 202) that was created by a user device (e.g., 104). In various cases, the user device 104 can have scanned and/or otherwise generated the digital artwork image, and it can be desired to determine whether the digital artwork image is plagiarized.

In various aspects, act 1204 can include transmitting, by the device (e.g., via 114), the digital artwork image to a third-party server (e.g., 1002). In various cases, the third-party server can be any suitable computing device and/or combination of computing devices, as desired.

In various instances, act 1206 can include retrieving, by the device (e.g., via 114), a set of plagiarism probabilities (e.g., 208) from the third party-server. In various cases, the third-party server can generate the set of plagiarism probabilities by comparing the digital artwork image to a set of cached digital artwork images (e.g., 204). In various cases, a given plagiarism probability in the set of plagiarism probabilities can indicate a likelihood that the digital artwork image was derived (e.g., plagiarized) from a given cached digital artwork image in the set of cached digital artwork images. In various cases, the third-party server can facilitate such comparison by executing a trained machine learning model (e.g., 206).

In various aspects, act 1208 can include calculating, by the device (e.g., via 120), an authenticity score (e.g., 210) for the digital artwork image based on the set of plagiarism probabilities. In various cases, the authenticity score can be equal to any suitable mathematical function that takes as arguments any of the set of plagiarism probabilities.

In various instances, act 1210 can include determining, by the device (e.g., via 122), whether the authenticity score for the digital artwork image satisfies a threshold authenticity value.

Although not explicitly shown in FIG. 12, the computer-implemented method 1200 can further include: when the authenticity score satisfies the threshold authenticity value, generating, by the device (e.g., via 122), a non-fungible token (e.g., 212 to represent the digital artwork image; and when the authenticity score fails to satisfy the threshold authenticity value, refraining, by the device (e.g., via 122), from generating the non-fungible token.

Although not explicitly shown in FIG. 12, the computer-implemented method 1200 can further include: estimating, by the device (e.g., via 124), a price (e.g., 216) of the non-fungible token, based on the authenticity score and based on one or more attributes (e.g., 902) associated with a user profile of the user device.

Although not explicitly shown in FIG. 12, the computer-implemented method 1200 can further include: depreciating, by the device (e.g., via 124), the price of the non-fungible token over a predetermined time period, wherein the predetermined time period can represent a countdown until the digital artwork image is likely to become a plagiarism target.

Although not explicitly shown in FIG. 12, the computer-implemented method 1200 can further include: deactivating, by the device (e.g., via 122), the non-fungible token when the predetermined time period elapses.

Although not explicitly shown in FIG. 12, the computer-implemented method 1200 can further include: when the authenticity score satisfies the threshold authenticity value, generating, by the device (e.g., via 122), a first electronic alert (e.g., 214) that indicates that a non-fungible token should be generated to represent the digital artwork image due to an absence of suspected plagiarism; and when the authenticity score fails to satisfy the threshold authenticity value, generating, by the device (e.g., via 122), a second electronic alert (e.g., 214) that indicates that the non-fungible token should not be generated to represent the digital artwork image due to suspected plagiarism.

Various embodiments described herein include a computerized tool that can help to prevent the illegitimate generation of non-fungible tokens for plagiarized digital artworks. Specifically, the computerized tool can access a digital artwork image, can compare (e.g., via execution of a trained machine learning model) the digital artwork image to a set of cached digital artwork images to generate a set of plagiarism probabilities, can compute an authenticity score based on the set of plagiarism probabilities, and can generate and/or refrain from generating a non-fungible token for the digital artwork image based on the value of the authenticity score. Such a computerized tool helps to address a significant security vulnerability of non-fungible tokens, and thus such a computerized tool certainly constitutes a useful and practical application of computers.

Although the herein disclosure mainly describes the set of cached digital artwork images 204 as being collectively stored by the set of private caches 106 and/or by the set of internet webpages 108, this is a mere non-limiting example. Those having ordinary skill in the art will appreciate that the set of cached digital artwork images 204 can be stored/maintained in any suitable fashions and/or locations (e.g., in public caches, private caches, publicly available webpages, and/or privately available webpages).

Although the herein disclosure mainly describes embodiments that prevent the illegitimate generation of non-fungible tokens for digital artwork images, this is a mere non-limiting example. Those having ordinary skill in the art will appreciate that the herein-described teachings can be applied to prevent the illegitimate generation of non-fungible tokens for any suitable electronic data that can be represented by non-fungible tokens. In other words, the herein-described teachings are not exclusively limited only to digital artwork images.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 13:
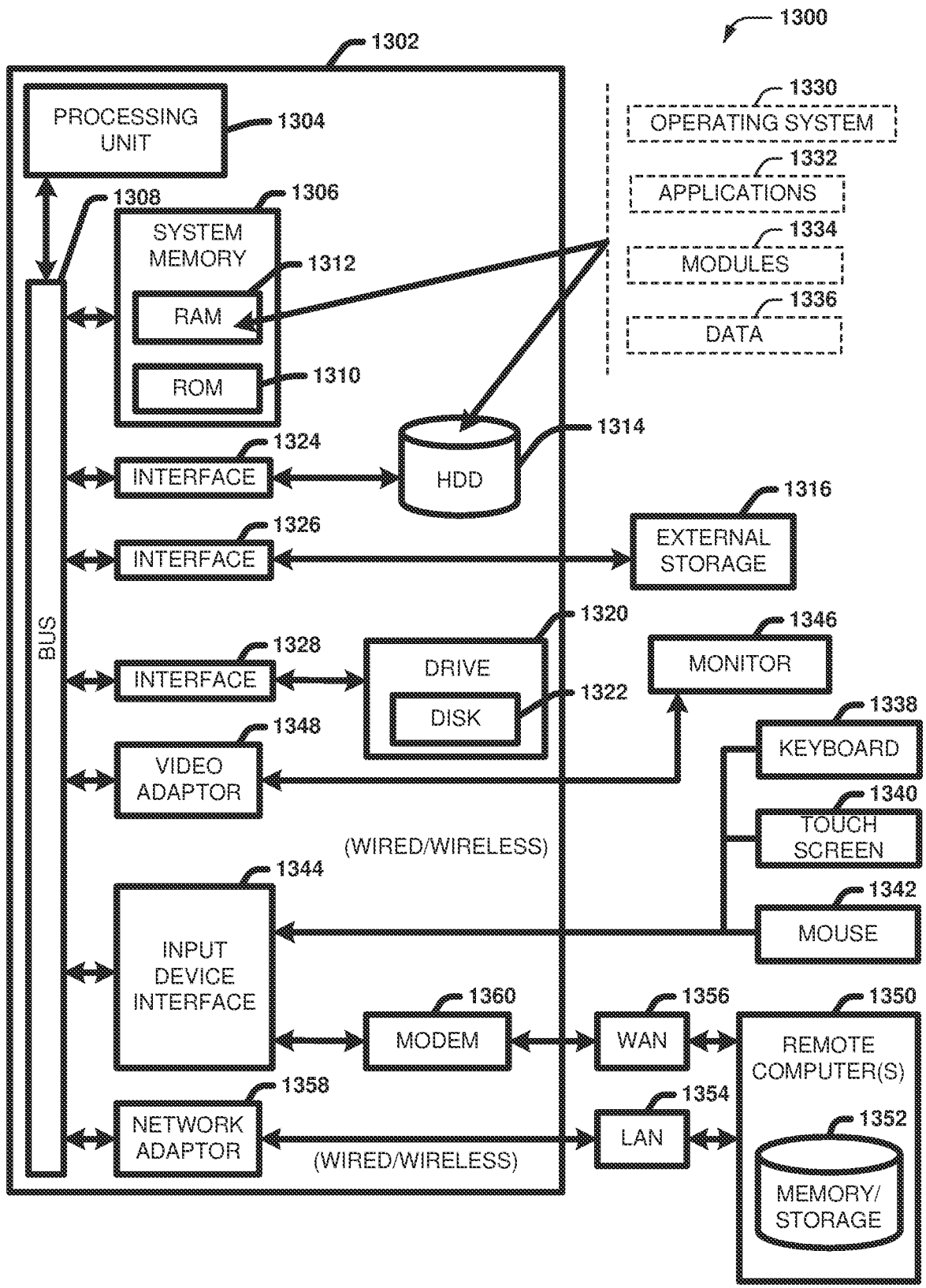
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
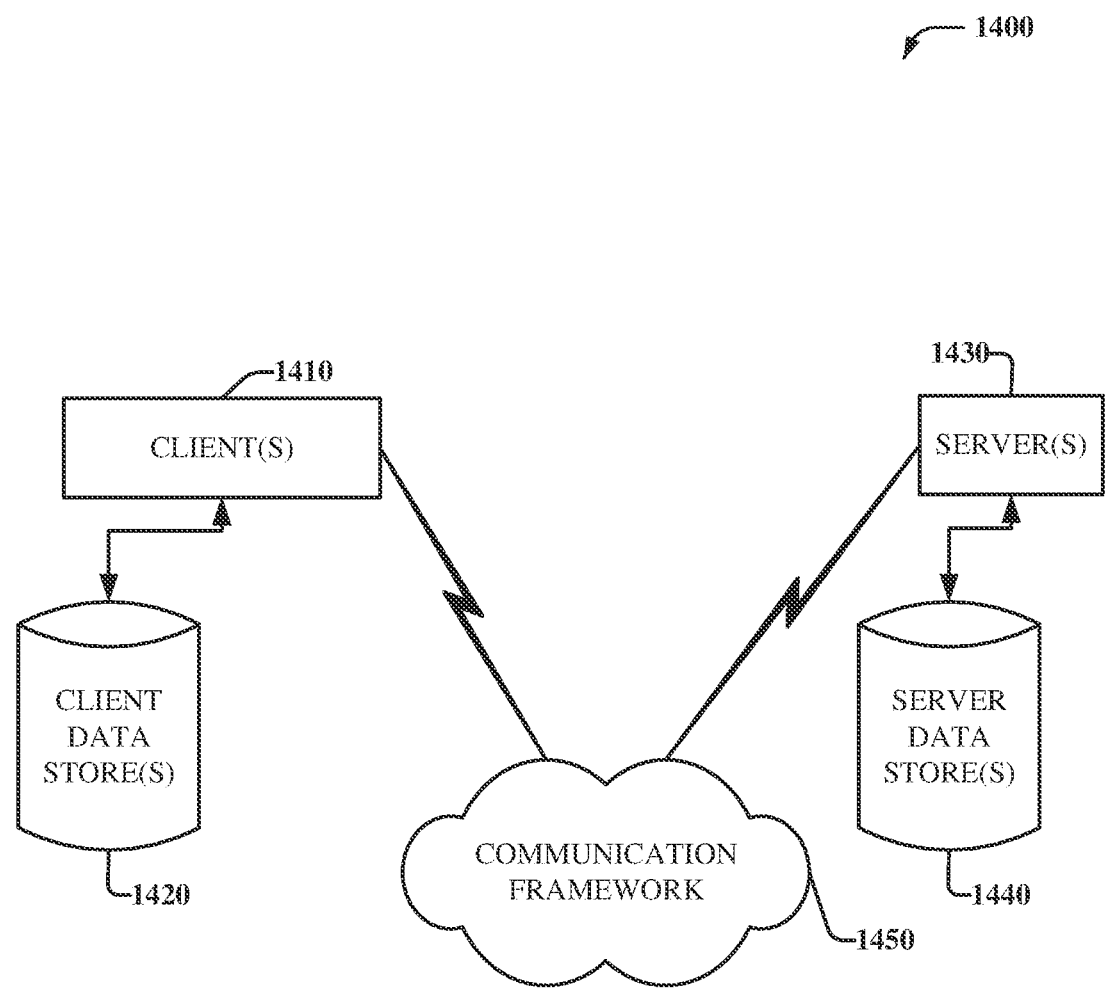
FIG. 14 illustrates an example networking environment operable to execute various implementations described herein.

FIG. 14 is a schematic block diagram of a sample computing environment 1400 with which the disclosed subject matter can interact. The sample computing environment 1400 includes one or more client(s) 1410. The client(s) 1410 can be hardware and/or software (e.g., threads, processes, computing devices). The sample computing environment 1400 also includes one or more server(s) 1430. The server(s) 1430 can also be hardware and/or software (e.g., threads, processes, computing devices). The servers 1430 can house threads to perform transformations by employing one or more embodiments as described herein, for example. One possible communication between a client 1410 and a server 1430 can be in the form of a data packet adapted to be transmitted between two or more computer processes. The sample computing environment 1400 includes a communication framework 1450 that can be employed to facilitate communications between the client(s) 1410 and the server(s) 1430. The client(s) 1410 are operably connected to one or more client data store(s) 1420 that can be employed to store information local to the client(s) 1410. Similarly, the server(s) 1430 are operably connected to one or more server data store(s) 1440 that can be employed to store information local to the servers 1430.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
a processor; and
a non-transitory computer-readable medium having stored thereon computer-executable instructions that are executable by the processor to cause the computer system to perform operations comprising:
accessing a digital artwork image;
generating a set of plagiarism probabilities by comparing the digital artwork image to a set of cached digital artwork images, wherein a given plagiarism probability in the set of plagiarism probabilities indicates a likelihood that the digital artwork image was derived from a given cached digital artwork image in the set of cached digital artwork images, wherein the comparing comprises, for each cached digital artwork image:
providing the digital artwork image and the cached digital artwork image to an input layer of a machine learning model;
wherein the digital artwork image and the cached digital artwork image complete a forward pass through one or more hidden layers of the machine learning model; and
wherein an output layer of the machine learning model produces the plagiarism probability respective of the cached digital artwork image;
calculating an authenticity score for the digital artwork image based on the set of plagiarism probabilities; and
determining whether the authenticity score for the digital artwork image satisfies a threshold authenticity value.

2. The computer system of claim 1, wherein the operations further comprise:
when the authenticity score satisfies the threshold authenticity value, generating a non-fungible token to represent the digital artwork image; and
when the authenticity score fails to satisfy the threshold authenticity value, refraining from generating the non-fungible token.

3. The computer system of claim 1, wherein the operations further comprise:
when the authenticity score satisfies the threshold authenticity value, generating a first electronic alert that indicates that a non-fungible token should be generated to represent the digital artwork image due to an absence of suspected plagiarism; and
when the authenticity score fails to satisfy the threshold authenticity value, generating a second electronic alert that indicates that the non-fungible token should not be generated to represent the digital artwork image due to suspected plagiarism.

4. The computer system of claim 1, wherein the trained machine learning model receives as input two or more fragments of the digital artwork image that are separated by predetermined distances and also receives as input the given cached digital artwork image, and wherein the trained machine learning model produces as output the given plagiarism probability.

5. The computer system of claim 1, wherein the trained machine learning model is a convolutional neural network.

6. The computer system of claim 1, wherein the operations further comprise:
transmitting one or more electronic requests to one or more private caches, wherein the one or more private caches collectively store the set of cached digital artwork images;
receiving, from the one or more private caches, one or more electronic permission authorizations in response to the one or more electronic requests; and
accessing the set of cached digital artwork images in response to the one or more electronic permission authorizations.

7. The computer system of claim 1, wherein the operations further comprise:
executing one or more web crawlers on the Internet, wherein the one or more web crawlers collectively identify the set of cached digital artwork images in one or more web pages of the Internet; and
accessing the set of cached digital artwork images.

8. The computer system of claim 1, wherein the operations further comprise:
when the authenticity score satisfies the threshold authenticity value, generating a first electronic alert that indicates that a non-fungible token should be generated to represent the digital artwork image due to an absence of suspected plagiarism; and
when the authenticity score fails to satisfy the threshold authenticity value, generating a second electronic alert that indicates that the non-fungible token should not be generated to represent the digital artwork image due to suspected plagiarism.

9. A computer-implemented method, comprising:
accessing, by a computer system comprising a processor, a digital artwork image that was created by a user device;
transmitting, by the computer system, the digital artwork image to a third-party server;
retrieving, by the computer system, a set of plagiarism probabilities from the third-party server, wherein the third-party server generates the set of plagiarism probabilities by comparing the digital artwork image to a set of cached digital artwork images, wherein a given plagiarism probability in the set of plagiarism probabilities indicates a likelihood that the digital artwork image was derived from a given cached digital artwork image in the set of cached digital artwork images, wherein the comparing comprises, for each cached digital artwork image:
providing the digital artwork image and the cached digital artwork image to an input layer of a machine learning model;
wherein the digital artwork image and the cached digital artwork image complete a forward pass through one or more hidden layers of the machine learning model; and
wherein an output layer of the machine learning model produces the plagiarism probability respective of the cached digital artwork image;
calculating, by the computer system, an authenticity score for the digital artwork image based on the set of plagiarism probabilities; and determining, by the computer system, that the authenticity score for the digital artwork image satisfies a threshold authenticity value.

10. The computer-implemented method of claim 9, further comprising:
in response to the authenticity score satisfying the threshold authenticity value, generating, by the computer system, a non-fungible token to represent the digital artwork image.

11. The computer-implemented method of claim 10, further comprising:
estimating, by the computer system, a price of the non-fungible token, based on the authenticity score and based on one or more attributes associated with a user profile of the user device.

12. The computer-implemented method of claim 11, further comprising:
depreciating, by the computer system, the price of the non-fungible token over a predetermined time period, wherein the predetermined time period represents a countdown until the digital artwork image is likely to become a plagiarism target.

13. The computer-implemented method of claim 12, further comprising:
deactivating, by the computer system, the non-fungible token when the predetermined time period elapses.

14. A non-transitory computer program product for facilitating detection of data duplication issues relating to generation of non-fungible tokens, the non-transitory computer program product comprising a computer-readable medium having program instructions embodied therewith, the program instructions executable by a processor to cause a computer system comprising the processor to perform operations comprising:
accessing a digital artwork image;
accessing a set of cached digital artwork images;
generating a set of plagiarism probabilities by comparing, via execution of a trained machine learning model, the digital artwork image to the set of cached digital artwork images, wherein a given plagiarism probability in the set of plagiarism probabilities indicates a likelihood that the digital artwork image was derived from a given cached digital artwork image in the set of cached digital artwork images, wherein the comparing comprises, for each cached digital artwork image:
providing the digital artwork image and the cached digital artwork image to an input layer of a machine learning model;
wherein the digital artwork image and the cached digital artwork image complete a forward pass through one or more hidden layers of the machine learning model; and
wherein an output layer of the machine learning model produces the plagiarism probability respective of the cached digital artwork image;
calculating an authenticity score for the digital artwork image based on the set of plagiarism probabilities; and
determining whether the authenticity score satisfies a threshold authenticity value.

15. The non-transitory computer program product of claim 14, wherein the accessing the set of cached digital artwork images includes:
transmitting one or more electronic requests to one or more private caches, wherein the one or more private caches collectively store the set of cached digital artwork images;
receiving, from the one or more private caches, one or more electronic permission authorizations in response to the one or more electronic requests; and
retrieving, from the one or more private caches, the set of cached digital artwork images in response to the one or more electronic permission authorizations.

16. The non-transitory computer program product of claim 14, wherein the accessing the set of cached digital artwork images includes:
executing one or more web crawlers on the Internet, wherein the one or more web crawlers collectively identify the set of cached digital artwork images in one or more web pages of the Internet; and
retrieving, from the Internet, the set of cached digital artwork images.

17. The non-transitory computer program product of claim 14, wherein the operations further comprise:
when the authenticity score satisfies the threshold authenticity value, generating a non-fungible token to represent the digital artwork image.

18. The non-transitory computer program product of claim 14, wherein the operations further comprise:
when the authenticity score fails to satisfy the threshold authenticity value, generating an electronic alert that indicates that a non-fungible token should not be generated to represent the digital artwork image due to suspected plagiarism.

* * * * *